（12） United States Patent
Yamamoto et al.

(10) Patent No.: US 7,502,592 B2
(45) Date of Patent: Mar. 10, 2009

(54) ADAPTIVE ANTENNA APPARATUS PROVIDED WITH CONTROLLER FOR CONTROLLING TO SELECT BEST DEMODULATED SIGNAL

(75) Inventors: Atsushi Yamamoto, Osaka (JP); Koichi Ogawa, Osaka (JP); Hiroshi Iwai, Osaka (JP); Yoshio Koyanagi, Kanagawa (JP); Akira Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 573 days.

(21) Appl. No.: 11/315,329

(22) Filed: Dec. 23, 2005

(65) Prior Publication Data

US 2007/0010202 A1    Jan. 11, 2007

(30) Foreign Application Priority Data

Dec. 27, 2004    (JP)    ............................. 2004-376327

(51) Int. Cl.
*H04B 1/00*    (2006.01)
(52) U.S. Cl. ........................................ 455/63.1; 455/78
(58) Field of Classification Search ................ 455/63.1, 455/130, 63.4, 67.13, 78, 79, 83; 370/401, 370/465; 375/267, 299
See application file for complete search history.

(56) References Cited

U.S. PATENT DOCUMENTS 5,710,995 A    1/1998    Akaiwa et al.
6,836,244 B2    12/2004    Kitakado

FOREIGN PATENT DOCUMENTS

JP    10-209890    8/1998
JP    2003-37547    2/2003
JP    2004-297281    10/2004

*Primary Examiner*—Sam Bhattacharya
(74) *Attorney, Agent, or Firm*—Wenderoth, Lind & Ponack, L.L.P.

(57) ABSTRACT

An adaptive antenna apparatus including a reception adaptive control circuit is provided. The reception adaptive control circuit adaptively controls respective received signals received by a plurality of antenna elements, and outputs the adaptively-controlled received signals as a combined received signal. A demodulator demodulates the combined received signal to a demodulated signal, and demodulates the respective received signals separately received by the respective antenna elements to demodulated signals. A controller compares signal quality of the demodulated signal of the combined received signal with signal qualities of the demodulated signals of the respective received signals separately received by the respective antenna elements, respectively, selects a demodulated signal having the highest signal quality, and controls to receive a received signal including a selected demodulated signal.

17 Claims, 27 Drawing Sheets

Fig. 29

| ITEM | BIT ERROR RATE |
|---|---|
| ONLY BY ANTENNA ELEMENT 91 | $2.1 \times 10^{-2}$ |
| ONLY BY ANTENNA ELEMENT 92 | $4.8 \times 10^{-16}$ |
| ADAPTIVE CONTROL | $4.4 \times 10^{-13}$ |
| IN-PHASE COMBINING | $7.1 \times 10^{-4}$ |
| MAXIMAL RATIO COMBINING | $6.6 \times 10^{-3}$ |
| SELECTION DIVERSITY | $3.7 \times 10^{-2}$ |

Fig. 31

| ITEM | BIT ERROR RATE |
|---|---|
| ONLY BY ANTENNA ELEMENT 91 | $5.6 \times 10^{-2}$ |
| ONLY BY ANTENNA ELEMENT 92 | $1.8 \times 10^{-2}$ |
| ADAPTIVE CONTROL | $1.2 \times 10^{-20}$ |
| IN-PHASE COMBINING | $3.3 \times 10^{-2}$ |
| MAXIMAL RATIO COMBINING | $4.2 \times 10^{-2}$ |
| SELECTION DIVERSITY | $7.1 \times 10^{-2}$ |

ADAPTIVE ANTENNA APPARATUS PROVIDED WITH CONTROLLER FOR CONTROLLING TO SELECT BEST DEMODULATED SIGNAL

BACKGROUND OF THE INVENTION

1. Field of the Invention

The present invention relates to an adaptive antenna apparatus provided with a controller for controlling to select a best demodulated signal. In particular, the present invention relates to an adaptive antenna apparatus for adaptively controlling to receive radio signals using a plurality of antenna elements, where the adaptive antenna apparatus is provided in an apparatus such as a portable radio communication apparatus of a mobile communication system to keep higher communication quality, and the present invention relates to a radio communication apparatus using the adaptive antenna apparatus.

2. Description of the Related Art

FIG. 32 is a block diagram showing a configuration of an adaptive antenna apparatus according to a prior art, which is disclosed in a specification of U.S. Pat. No. 5,710,995 (referred to as a Patent Document 1 hereinafter) and Japanese patent laid-open publication No. 10-209890 (referred to as a Patent Document 2 hereinafter). This adaptive antenna apparatus is an example of a configuration in which an adaptive antenna and a selection diversity antenna are combined. By switching over between the adaptive antenna and the selection diversity antenna, it is possible to keep respective signal qualities of signals received by the antenna apparatus at higher signal quality.

Referring to FIG. 32, the adaptive antenna apparatus is configured by including two antenna elements 111 and 112, two processing circuits 113 and 114, two detectors 115 and 116, a signal quality monitoring circuit 117, and a selector circuit 118. First of all, respective radio signals received by the antenna elements 111 and 112 are inputted to the processing circuits 113 and 114. The processing circuit 113 executes an adaptive control processing on inputted radio signals, and thereafter, outputs a resultant signal to the detector 115 and the signal quality monitoring circuit 117. In this case, by suppressing an interference wave in a received radio signal, the processing circuit 113 keeps signal quality of the received radio signal at higher signal quality. Namely, the processing circuit 113 exhibits a great effect when delay waves or cochannel interference waves from adjacent base stations arrive. In addition, the processing circuit 114 executes a selection diversity processing on inputted radio signals, and thereafter, outputs a resultant signal to the detector 116 and the signal quality monitoring circuit 117. In this case, the processing circuit 114 selects a radio signal having higher received power from the radio signals received by the antenna elements 111 and 112, respectively, so as to keep the signal quality thereof at higher signal quality. Namely, the processing circuit 114 exhibits a great effect when the received power fluctuates greatly, such as fading.

In this case, the signal quality monitoring circuit 117 judges signal quality of a baseband signal which is obtained by demodulating a radio signal adaptively controlled by the processing circuit 113, and signal quality of a radio signal subjected to the selection diversity processing by the processing circuit 114. The selector circuit 118 selects a baseband signal from the detector 115 or 116, which corresponds to a signal having a higher signal quality, and outputs a selected baseband signal to an output terminal 119. The adaptive antenna apparatus configured as described above can solve both of the interference wave and the fading, that are two major factors of degradation of signal quality of a received signal in a mobile communication system.

The above-described adaptive antenna according to the prior art has the following disadvantageous problems. In this case, using a radio communication apparatus 90 shown in FIG. 18, such as a cellular telephone including two antenna elements 91 and 92, as a comparative example, a simulation made by the inventors of the present invention and results of the simulation are described below.

Referring to FIG. 18, the radio communication apparatus 90 is provided with an antenna element 91, which is a monopole antenna, so that the antenna element 91 is contained in a rectangular parallelepiped radio communication apparatus housing 90A and protrudes from an upper surface of the housing 90A in a vertical direction. On the other hand, the antenna element 92, which is an inverted F-type antenna, is provided to be parallel to a side surface of the radio communication apparatus housing 90A. In the antenna element 92, a radio signal is fed to a feeding point 93a approximately at a central portion of one side of the antenna element 92 through a feeding line 93. A short-circuit line 94 is connected to a short-circuit point 94a approximately at a central portion of one surface of the antenna element 92 from a short-circuit point 94b of the radio communication apparatus housing 90A, so as to be short-circuited. In this comparative example, such a case is considered in which the radio communication apparatus 90 is inclined at 30 degrees to a horizontal direction 99, as shown in FIG. 19.

For example, when a frequency of the radio signal is 2 GHz, a wavelength of the radio signal is 150 millimeters. When a length in a longitudinal direction of the housing 90A of the radio communication apparatus 90 shown in FIG. 18 is 125 millimeters, the length of the housing 90A is close to the wavelength of the radio signal. In this case, a radiation directivity often shows a directional pattern having an angle (referred to as a null hereinafter) with a greatly dropped received power, since the housing 90A is small in size. For example, FIG. 20 shows a directional pattern of the antenna element 91, and FIG. 21 shows a directional pattern of the antenna element 92. In FIG. 21, received power of the antenna element 92 is normalized based on maximum received power of the antenna element 91 shown in FIG. 20. As apparent from FIG. 21, the directional pattern of the antenna element 92 has two nulls. In the comparative example, such a case is considered in which a desired wave arrives from a direction at zero degrees with respect to a -Y axis direction on an XY plane and an interference wave arrives from a direction at 210 degrees on the XY plane.

Such a case will be considered below, where a multiplier 95a multiplies a radio signal received by the antenna element 91 by a weighting coefficient W1, a multiplier 95b multiplies a radio signal received by the antenna element 92 by a weighting coefficient W2, and thereafter, a signal combiner 96 combines resultant radio signals to obtain a radio signal by an adaptive control circuit shown in FIG. 22. In this case, for example, FIGS. 23 to 29 are obtained as results of a simulation, in which in a directional pattern of the antenna element 91 shown in FIG. 23 and a directional pattern of the antenna element 92 shown in FIG. 24, the above-mentioned desired wave and interference wave arrive, and adaptive control is carried out so that a null is formed in a direction of the interference wave for the antenna element 92. In FIGS. 23 to 28, received power of each of the radiation patterns is normalized by using each maximum received power. As is apparent from these results shown in FIGS. 23 to 29, a bit error rate during the adaptive control is larger than a bit error rate of the single antenna element 92. Namely, the simulation results are summarized as follows.

For example, such a case is considered below in which one desired wave and one interference wave arrive and these two waves are equal in magnitude. Further, when the interference wave arrives from an angle with null of the directional pattern of the antenna element 92, the antenna element 92 does not receive any interference wave and receives only the desired wave. On the other hand, the antenna element 91 receives both of the desired wave and the interference wave. The adaptive array antenna apparatus controls signal components of the interference wave received by the two antenna elements 91 and 92 to be equal in magnitude and opposite in phase, and cancels interference wave components. This leads to higher signal quality being obtained. Namely, when only one antenna element receives the interference wave, an interference wave suppression effect due to the adaptive control cannot be obtained. On the other hand, since the antenna element 92 receives only the desired wave without receiving the interference wave, higher signal quality can be obtained. Namely, by performing the adaptive control, the signal quality often becomes lower than that when a single antenna element is used.

On the other hand, the above-described adaptive antenna apparatus according to the prior art executes the adaptive control and the diversity control. However, higher signal quality cannot be obtained in such a situation, Namely, under the diversity control, the first antenna element that receives both of the desired wave and the interference wave is often selected so as to select a signal larger in power from received signals (paragraph 0019 of the specification of the Patent Document 2 discloses that a diversity judgment criterion is either an average power or an average signal power). In such a situation, the signal quality cannot be improved not only by the adaptive control but also by the diversity control. Namely, the adaptive antenna apparatus according to the prior art cannot improve the signal quality when the radiation directivity of the antenna has the null. Accordingly, the adaptive antenna apparatus according to the prior art is unavoidably inappropriate.

SUMMARY OF THE INVENTION

An object of the present invention is to provide an adaptive antenna apparatus capable of solving the above-described problems, and capable of suppressing an interference wave even when only one antenna element among a plurality of antenna elements receives the interference wave, and to provide a radio communication apparatus using the adaptive antenna apparatus.

According to the first aspect of the present invention, an adaptive antenna apparatus includes a plurality of antenna elements, an adaptive controller, a demodulator, and an apparatus controller. The adaptive controller adaptively controls respective received signals received by the antenna elements, and outputs adaptively-controlled respective received signals as a combined received signal. The demodulator demodulates the combined received signal into a demodulated signal, and demodulates the respective received signals received separately by respective antenna elements into demodulated signals. The apparatus controller compares signal quality of the demodulated signal of the combined received signal with signal qualities of the demodulated signals of the respective received signals received separately by the respective antenna elements, respectively, selects a demodulated signal having the highest signal quality, and controls to receive a received signal including a selected demodulated signal.

The above-mentioned adaptive antenna apparatus preferably includes three or more antenna elements. The adaptive controller adaptively preferably controls respective received signals received by all of the three or more antenna elements and outputs respective adaptively-controlled received signals as a first combined received signal, and the adaptive controller adaptively controls respective received signals received by antenna elements of a part of the three or more antenna elements and outputs respective adaptively-controlled received signals as a second combined received signal. The apparatus controller preferably compares signal quality of a demodulated signal of the first combined received signal, signal quality of a demodulated signal of the second combined received signal, and the signal qualities of the demodulated signals of the respective received signals received separately by the respective antenna elements, selects a demodulated signal having the highest signal quality, and controls to receive a received signal including a selected demodulated signal.

In addition, in the above-mentioned adaptive antenna apparatus, the apparatus controller preferably executes a first reception adaptive control processing including the steps of:

when the signal quality of the demodulated signal of the combined received signal is equal to or higher than a predetermined threshold value, controlling to receive the adaptively-controlled combined received signal; and when the signal quality of the demodulated signal of the combined received signal is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal.

Further, in the above-mentioned adaptive antenna apparatus, the apparatus controller preferably executes a second reception adaptive control processing including the steps of:

when the highest signal quality among the signal qualities of the demodulated signals of the respective received signals received separately by the respective antenna elements is equal to or higher than a predetermined threshold value, controlling to receive a received signal, which is one of the received signals received separately by the respective antenna elements, and which includes a demodulated signal having the highest signal quality among the signal qualities of the demodulated signals of the respective received signals separately received by the respective antenna elements, and when the highest signal quality among the signal qualities of the demodulated signals of the respective received signals received separately by the respective antenna elements is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal.

Still further, in the above-mentioned adaptive antenna apparatus, the apparatus controller preferably executes a third reception adaptive control processing including the steps of:

after acquiring all of the signal quality of the demodulated signal of the combined received signal and the signal qualities of the demodulated signals of the respective received signals received separately by the respective antenna elements, comparing acquired signal qualities, selecting a demodulated signal having the highest signal quality, and controlling to receive a demodulated signal including a selected demodulated signal.

In addition, in the above-mentioned adaptive antenna apparatus, the apparatus controller preferably executes one of the first, second, and third reception adaptive control processings by selectively switching over among the first, second, and third reception adaptive control processings, according to a predetermined selection criterion. In this case, the selection criterion is preferably a criterion based on a transmission rate Vth of the demodulated signal. In addition, the apparatus controller preferably executes one of the first, second, and third reception adaptive control processings by selectively switching over among the first, second, and third reception adaptive control processings using two predetermined threshold rates Vth1 and Vth2 in the following manners:

(A) when the communication rate Vth has a relationship of Vth<Vth1, the apparatus controller executes the second reception adaptive control processing;

(B) when the transmission rate Vth has a relationship of Vth1≦Vth<Vth2, the apparatus controller executes the first reception adaptive control processing; and (C) when the transmission rate Vth has a relationship of Vth≧Vth2, the apparatus controller executes the third reception adaptive control processing.

According to the second aspect of the present invention, a radio communication apparatus includes the above-mentioned adaptive antenna apparatus and a radio receiver circuit for receiving a radio signal using the adaptive antenna apparatus.

According to the third view of the present invention, a radio communication apparatus includes the above-mentioned adaptive antenna apparatus and a radio transceiver circuit that transmits and receives a radio signal using the adaptive antenna apparatus.

Accordingly, each of the adaptive antenna apparatus and the radio communication terminal apparatus using the same according to the present invention compares the signal quality of the demodulated signal of the combined received signal with those of demodulated signals of the respective received signals separately received by the respective antenna elements, selects a demodulated signal having the highest signal quality, and controls to receive a received signal including the selected demodulated signal. Therefore, even when only one antenna element among a plurality of antenna elements receives the interference wave, it is possible to suppress the interference wave.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 29 is a table showing bit error rates of demodulated received data during respective controls according to the comparative example of FIG. 22;

FIG. 31 is a table showing bit error rates of demodulated received data during respective controls according to the first implemental example shown in FIG. 30.

DETAILED DESCRIPTION OF THE PREFERRED EMBODIMENTS

Preferred embodiments according the present invention will be described below with reference to the drawings. In the attached drawings, the same numerical references denote components similar to each other.

First Preferred Embodiment

Figure 1:
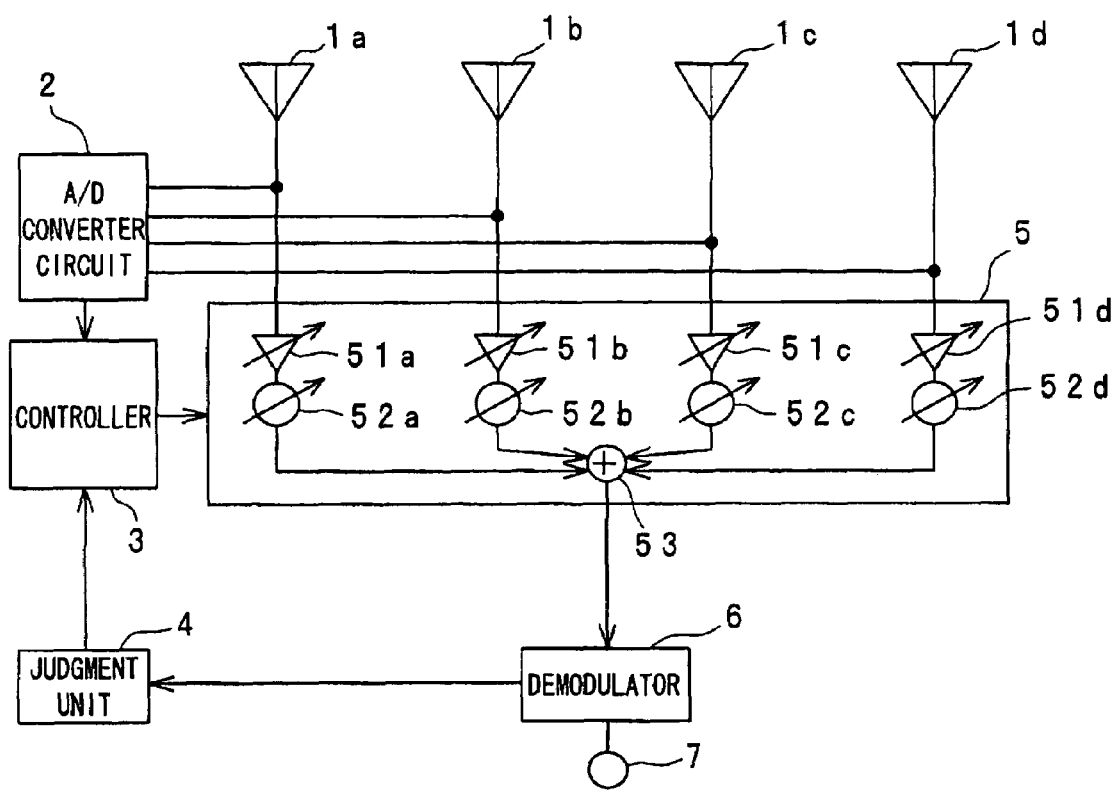
FIG. 1 is a block diagram showing a configuration of an adaptive antenna apparatus according to a first preferred embodiment of the present invention.

FIG. 1 is a block diagram showing a configuration of an adaptive antenna apparatus according to a first preferred embodiment of the present invention. Referring to FIG. 1, the adaptive antenna apparatus according to the present preferred embodiment is configured by including four antenna elements 1a to 1d, an analog-to-digital converter circuit 2 (the analog-to-digital converter will be referred to as an A/D converter hereinafter), a controller 3, a judgment unit 4, a reception adaptive control circuit 5, a demodulator 6, and an output terminal 7.

Referring to FIG. 1, radio signals received by the respective antenna elements 1a to 1d are inputted to the A/D converter circuit 2 and the reception adaptive control circuit 5. The A/D converter circuit 2 includes A/D converters each corresponding to each of the antenna elements 1a to 1d, and A/D converts the radio signals received by the antenna elements 1a to 1d into digital signals, respectively, and outputs the digital signals to the controller 3.

The reception adaptive control circuit 5 is configured by including four variable gain amplifiers 51a to 51d, four phase shifters 52a to 52d, and a signal combiner 53 which is an adder. Variable amplitude amounts of the respective four variable gain amplifier 51a to 51d and phase shift amounts of the respective four phase shifters 52a to 52d are controlled by the controller 3. The radio signal received by the antenna element 1a is outputted to the signal combiner 53 via the variable gain amplifier 51a and the phase shifter 52a. The radio signal received by the antenna element 1b is outputted to the signal combiner 53 via the variable gain amplifier 51b and the phase shifter 52b. The radio signal received by the antenna element 1c is outputted to the signal combiner 53 via the variable gain amplifier 51c and the phase shifter 52c. The radio signal received by the antenna element 1d is outputted to the signal combiner 53 via the variable gain amplifier 51d and the phase shifter 52d. The signal combiner 53 adds up four inputted radio signals to combine them, and outputs a combined radio signal to the demodulator 6.

The demodulator 6 demodulates a radio signal inputted from the signal combiner 53 into a baseband signal, which is a demodulated signal, by a predetermined digital demodulation method, and outputs the baseband signal to the output terminal 7 and the judgment unit 4. The judgment unit 4 measures a bit error rate based on a reference pattern, which is in a predetermined reference period of an inputted baseband signal. The controller 3 controls the reception adaptive control circuit 5 to receive and demodulate a radio signal having the highest signal quality using an adaptive control method described later in detail. Although high frequency circuits such as high frequency filters for separating frequencies, high frequency amplifiers for amplifying radio signals, mixers for converting radio signals into intermediate frequency signals each having a predetermined intermediate frequency, intermediate frequency circuits, signal processing circuits, and the like are also included in the configuration shown in FIG. 1, these circuits are not shown in FIG. 1. Namely, the reception adaptive control circuit 5 may execute a reception adaptive control at a carrier wave frequency or at an intermediate frequency after signals are converted into intermediate frequency signals. In addition, in the reception adaptive control circuit 5, orders of signal processings executed by the variable gain amplifiers 51a to 51d and the phase shifters 52a to 52d are not limited to those shown in FIG. 1, but may be reverse to the orders shown in FIG. 1.

First of all, the adaptive control method executed by the adaptive antenna apparatus will be described. The adaptive antenna apparatus uses an adaptive control technique for realizing a stable radio communication by maximizing a radiation pattern of an antenna in a direction of arrival of a desired wave (that is, by orienting a main beam in the radiation pattern of the antenna substantially toward the direction of the desired wave), and by orienting a null of the radiation pattern to a direction of an interference wave that disturbs signal reception (that is, by orienting the null of the radiation pattern of the antenna substantially toward the direction of the interference wave). Usually, as shown in FIG. 1, the adaptive antenna apparatus includes the variable gain amplifiers 51a to 51d, which are amplitude adjustment circuits, and the phase shifters 52a to 52d each corresponding to each of the antenna elements 1a to 1d. By providing amplitude differences and phase differences to the radio signals received by the respective antenna elements 1a to 1d (or intermediate frequency signals frequency-converted from the radio signals), the adaptive antenna apparatus controls to realize the largest desired signal power and the smallest interference signal power.

A thermal noise component is normally received together with a desired wave signal, as each of the radio signals received by the respective antenna elements 1a to 1d. Further, a cochannel interference wave, having the same frequency as that of the desired wave from an adjacent base station or a delay wave, or a delay wave which is the desired wave but has a time delay because of arrival via a large path, is often received. In an analog radio communication system for use in television broadcasting, radio broadcasting, or the like, the delay wave deteriorates an image display quality as, for example, a ghost displayed by a television receiver. On the other hand, in a digital radio communication system, the thermal noise, the cochannel interference wave or the delay wave has an influence as a bit error and directly deteriorates signal quality. In this case, let the desired wave power to be "C", the thermal noise power to be "N", and the power of the interference wave including the cochannel interference wave and the delay wave to be "I". In order to improve the signal quality, the adaptive antenna apparatus preferably adaptively controls to maximize the value of C/(N+I).

Next, an adaptive control operation performed by the adaptive antenna apparatus will be concretely described with reference to FIG. 1.

The radio signals received by the respective antenna elements 1a to 1d are converted into a digital signal x(t) (which is a signal vector having four elements, in the present preferred embodiment) by the A/D converter circuit 2, and inputted to the controller 3. The controller 3 decides the amplitude amounts of the respective four variable gain amplifier 51a to 51d and the phase shift amounts of the respective four phase shifters 52a to 52d of the reception adaptive control circuit 5, so that a digital signal y(t) outputted from the reception adaptive control circuit 5 has the highest signal quality. A method for calculating weighting coefficients including the amplitude amounts and phase shift amounts will be described hereinafter. A weighting coefficient Wi is defined by the following equation by using an amplitude amount Ai and a phase shift amount φ:

$$Wi = Ai \cdot exp(j \cdot \phi i) \quad (1).$$

In this case, "j" denotes an imaginary unit. In addition, "i" takes a value in a range of 1 to 4, and each "i" corresponds to each of systems processing the radio signals received by the antenna elements 1a to 1d. A weighting vector "W" is defined including the weighting coefficient Wi as an element, and a method for calculating the weighting coefficient Wi will be described hereinafter.

Several methods are known for calculating the weighting coefficient Wi. Among them, a method using the LMS (Least Means Squares) will be described as an example. With this method, the adaptive antenna apparatus stores a reference signal r(t), which is a signal sequence included in a known desired wave in advance. The adaptive antenna apparatus controls so that a signal sequence included in the received signal becomes closer to the reference signal r(t). Such a case where the reference signal r(t) is stored in the controller 3 in advance will be described as an example. Concretely speaking, the controller 3 controls the reception adaptive control circuit 5 so that the radio digital signal x(t) is multiplied by the weighting coefficient w(t) having the amplitude amount and phase shift amount as components thereof. A residual e(t) between a multiplication result of multiplying the radio digital signal x(t) by the weighting coefficient w(t) and the reference signal r(t) is obtained by the following equation:

$$e(t) = r(t) - w(t) \times x(t) \quad (2).$$

In this case, the residual e(t) has either a positive or a negative value. Accordingly, the minimum value of a value which is a square of the residual e(t) calculated by the Equation (2) is obtained by iterative calculations recurrently. Namely, a weighting coefficient w(t, m+1) obtained by a plurality of (m+1)-th time iterative calculation is obtained by the following equation using an m-th weighting coefficient w(t, m):

$$w(t, m+1) = w(t, m) + u \times x(t) \times e(t, m) \quad (3).$$

In this case, the "u" is called a step size. When the step size "u" is relatively large, there is such an advantageous effect that a number of the iterative calculations by which the weighting coefficient "w" converges on a minimum value is small. However, when the step size "u" is too large, there is such a disadvantageous effect that an oscillation near the minimum value occurs. Accordingly, it is necessary to take due care of selection of the step size "u" depending on the system. Conversely, by setting the step size "u" to a smaller value, the weighting coefficient "w" stably converges on the minimum value. However, the number of the iterative calculations increases. When the number of the iterative calculations increases, it takes a long time to obtain the weighting coefficient. Provided that a calculation time for calculating the weighting coefficient "w" is longer than a time (e.g., several milliseconds) during which surrounding environment changes, it is impossible to improve the signal quality by this weighting coefficient "w". Accordingly, it is necessary to select conditions in which the weighting coefficient "w" converges on the minimum value at as high rate as possible and as stably as possible to decide the step size "u". In addition, the residual e(t, m) is defined by the following equation:

$$e(t, m) = r(t) - w(t, m) \times x(t) \quad (4).$$

Using this Equation (4), the Equation (3) is recurrently updated. The maximum number of the iterative calculations for obtaining the weighting coefficient "w" is set so that the weighting coefficient calculation time is not longer than radio system switchover time.

A judgment method for adaptive control over the radio communication system based on the LMS is described here as an example. However, the present invention is not limited to this. For example, the RLS (Recursive Least-Squares) method or the SMI (Sample Matrix Inversion) method capable of making faster judgment may be also used. Using any of these methods realizes the faster judgment, however, a calculation made by the judgment unit 4 is more complicated. In addition, when a modulation method of a signal sequence is a low envelope modulation having a fixed envelope such as a digital phase modulation, a CMS (Constant Modulus Algorithm) can be used.

Figure 2:
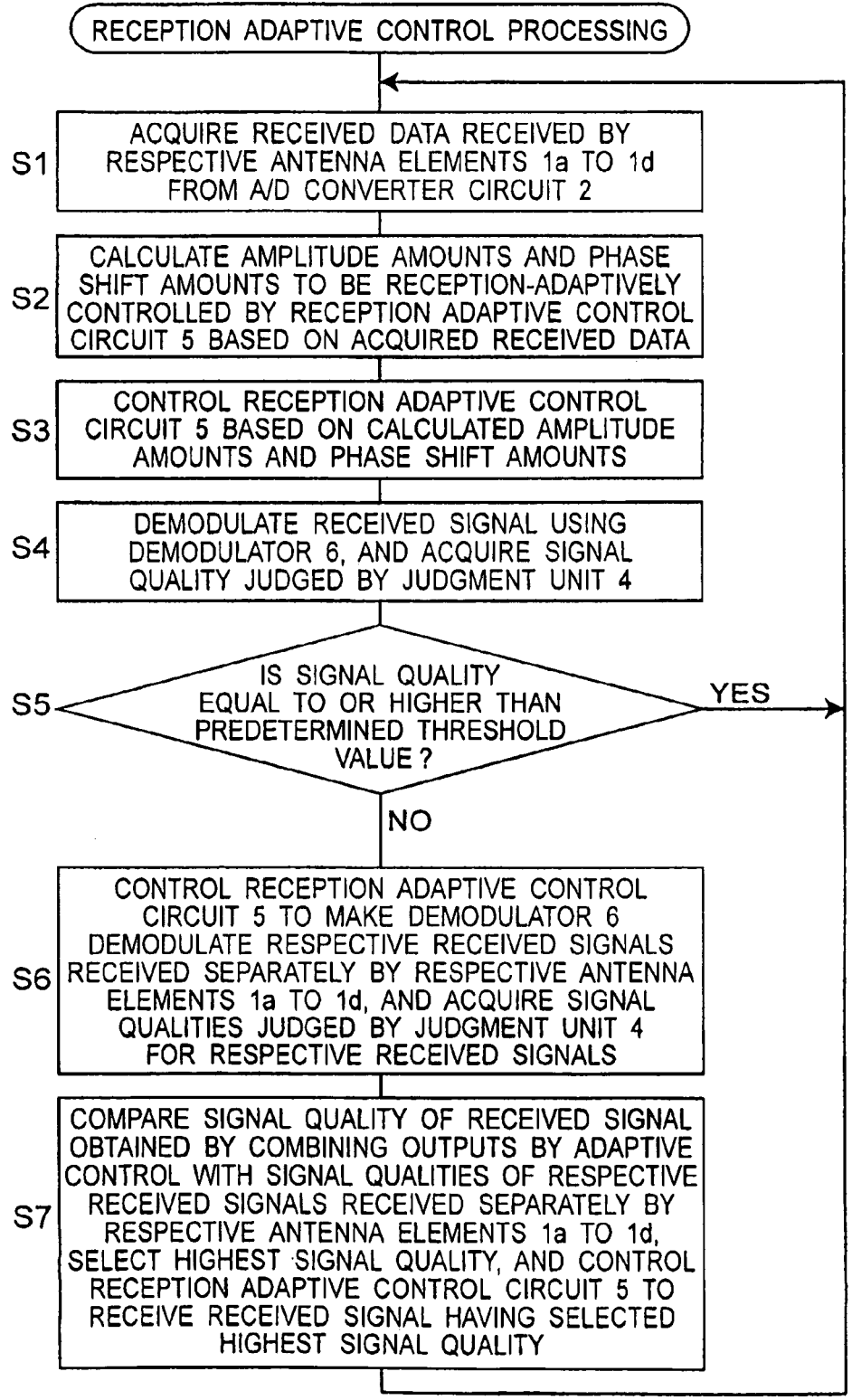
FIG. 2 is a flowchart showing a reception adaptive control processing executed by a controller 3 shown in FIG. 1.

FIG. 2 is the flowchart showing a reception adaptive control processing executed by the controller 3 shown in FIG. 1.

Referring to FIG. 2, first of all, at step S1, the controller 3 acquires the received data received by the respective antenna elements 1a to 1d from the A/D converter circuit 2. At step S2, the controller 3 calculates the amplitude amounts and phase shift amounts to be reception-adaptively controlled by the reception adaptive control circuit 5 based on acquired received data. Next, at step S3, the controller 3 controls the reception adaptive control circuit 5 based on the calculated amplitude amounts and phase shift amounts. At step S4, the controller 3 demodulates the received signal using the demodulator 6, and acquires signal quality judged by the judgment unit 4. Then, at step S5, the controller 3 judges whether the signal quality is equal to or higher than a predetermined threshold value, e.g., whether a bit error rate which is the signal quality is equal to or lower than $10^{-5}$. If YES at step 5, the control flow returns to step S1. On the other hand, if NO at step S5, the control flow goes to step S6. At step S6, the controller 3 controls the reception adaptive control circuit 5 to make the demodulator 6 demodulate the respective received signals received separately by the respective antenna elements 1a to 1d, and acquires bit error rates which are signal qualities judged by the judgment unit 4 for the respective received signals. In this case, the respective received signals received separately by the respective antenna elements 1a to 1d are those acquired when the respective antenna elements 1a to 1d are made to operate separately. Concretely speaking, when only the antenna element 1a is activated, and the antenna elements 1b to 1d are not activated, an amplification factor of the variable gain amplifier 51a is set to 1, a phase shift amount of the phase shifter 52a is set to zero, and amplification factors of the other variable gain amplifiers 51b to 51d are set to zero so that the radio signals do not pass therethrough. Further, at step S7, the controller 3 compares the bit error rate which is the signal quality of the received signal obtained by combining the outputs by the adaptive control with bit error rates which are signal qualities of the respective received signals received separately by the respective antenna elements 1a to 1d, and selects a bit error rate which indicates the highest signal quality. In addition, the controller 3 controls the reception adaptive control circuit 5 to receive a received signal having the bit error rate which is the selected highest signal quality. Then, the control flow returns to step S1.

Referring to FIG. 2, when the control flow returns from step S5 to step S1 or from step S7 to step S1, the controller 3 preferably waits for a predetermined time and then executes the same processing.

By executing the reception adaptive control processing shown in FIG. 2, the controller 3 checks the bit error rate which is the signal quality while adaptively controlling with using the four antenna elements 1a to 1d. The controller 3 measures the signal qualities of the received signals received separately by the respective antenna elements 1a to 1d when the bit error rate is lower than the predetermined threshold value, and thereafter controls the reception adaptive control circuit 5 to receive a received signal having the lowest bit error rate which is the highest signal quality. Accordingly, as shown in FIGS. 22 to 29, for example, even if the radiation directivity of the antenna element 92 has the null, the interference wave (the cochannel interference wave or the delay wave) arrives from the direction of this null, and the interference wave cannot be suppressed since only the antenna element 91 receives the interference wave, it is possible to always select the received signal having the highest signal quality by executing a processing for switching over between the adaptive control and the reception of the signals separately by the respective antenna elements as shown in FIG. 2.

Figure 3:
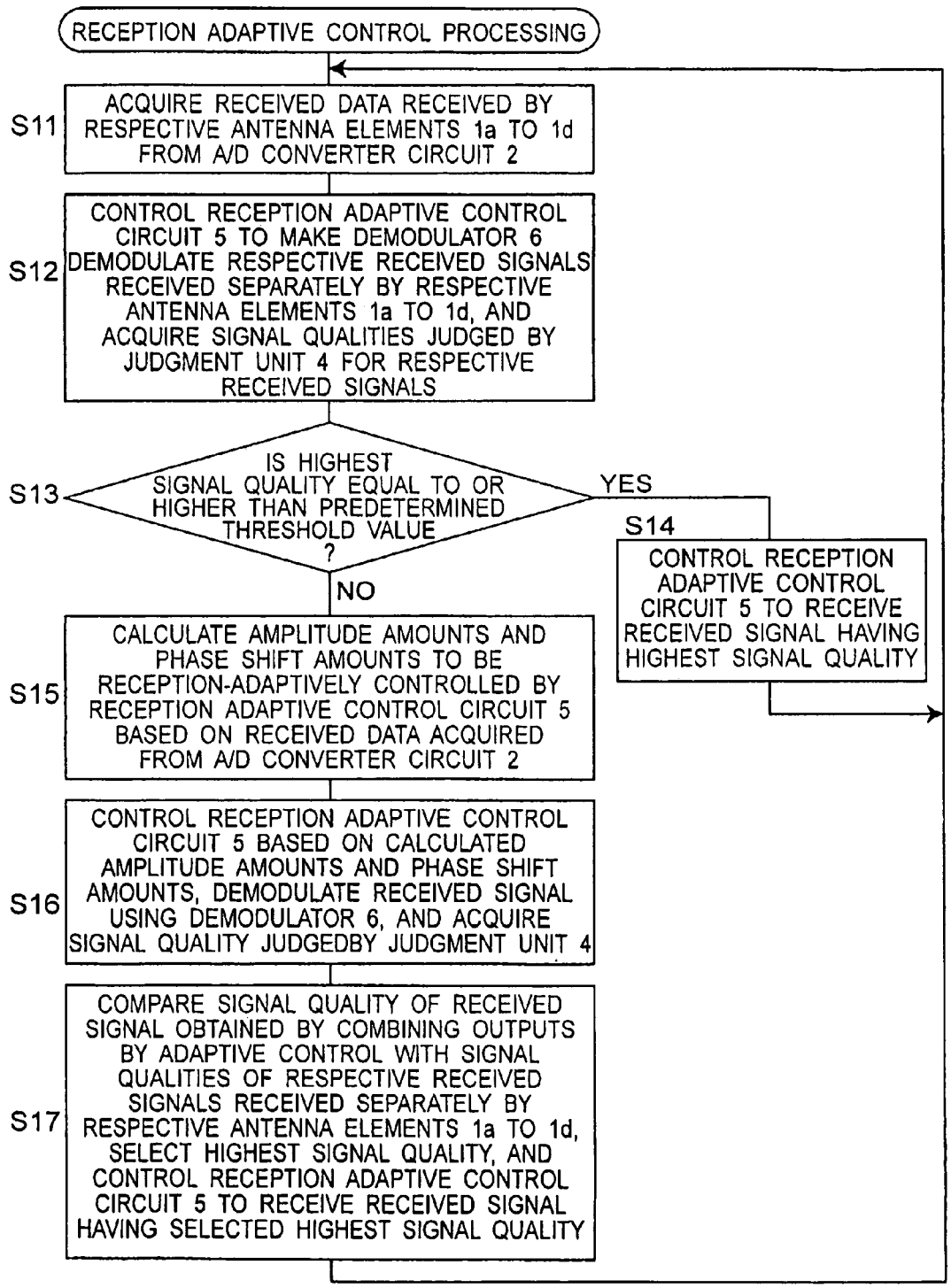
FIG. 3 is a flowchart showing a reception adaptive control processing executed by the controller 3 shown in FIG. 1 according to a first modified preferred embodiment of the first preferred embodiment of the present invention.

FIG. 3 is a flowchart showing a reception adaptive control processing executed by the controller 3 shown in FIG. 1 according to a first modified preferred embodiment of the first preferred embodiment of the present invention.

Referring to FIG. 3, first of all, at step S11, the controller 3 acquires the received data received by the respective antenna elements 1a to 1d from the A/D converter circuit 2. At step S12, the controller 3 controls the reception adaptive control circuit 5 to make the demodulator 6 demodulate the respective received signals received separately by the respective antenna elements 1a to 1d, and acquires bit error rates which are signal qualities judged by the judgment unit 4 for the respective received signals. Next, at step S13, the controller 3 judges whether the highest signal quality is equal to or higher than a predetermined threshold value, e.g., whether or not the bit error rate which is the signal quality is equal to or lower than $10^{-5}$. If YES at step S13, the control flow goes to step S14. On the other hand, if NO at step S13, the control flow goes to step S15. At step S14, the controller 3 controls the reception adaptive control circuit 5 to receive a received signal having the highest signal quality, and thereafter the control flow returns to step S11. At step S15, the controller 3 calculates amplitude amounts and phase shift amounts to be reception-adaptively controlled by the reception adaptive control circuit 5 based on the received data acquired from the A/D converter circuit 2. At step S16, the controller 3 controls the reception adaptive control circuit 5 based on the calculated amplitude amounts and phase shift amounts, demodulate the received signal using the demodulator 6, and acquires a bit error rate which is signal quality judged by the judgment unit 4. Further, at step S17, the controller 3 compares the bit error rate of the received signal obtained by combining the outputs by the adaptive control with bit error rates of the respective received signals received separately by the respective antenna elements 1a to 1d, and selects the highest signal quality. In addition, the controller 3 controls the reception adaptive control circuit 5 to receive a received signal having a lowest bit error rate. Then, the control flow returns to step S11.

Referring to FIG. 3, when the control flow returns from step S14 to step S11 or from step S17 to step S11, the controller 3 preferably waits for a predetermined time, and then, executes the same processing.

By executing the reception adaptive control processing shown in FIG. 3, the controller 3 measures the signal qualities of the respective received signals received separately by the respective antenna elements 1a to 1d, and controls the reception adaptive control circuit 5 to receive a received signal having the highest signal quality. When the highest signal quality is lower than the predetermined threshold value, the controller 3 adaptively controls with using the four antenna elements 1a to 1d, and measures the signal quality of the combined signal by the adaptive control. Then, the controller 3 controls the reception adaptive control circuit 5 to receive a received signal having a lowest bit error rate. Accordingly, as shown in FIGS. 22 to 29, for example, even if the radiation directivity of the antenna element 92 has the null, the interference wave (the cochannel interference wave or the delay wave) arrives from the direction of this null, and the interference wave cannot be suppressed since only the antenna element 91 receives the interference wave, it is possible to always select the received signal having the highest signal quality by executing a processing for switching over between the adaptive control and the reception of the signals separately by the respective antenna elements as shown in FIG. 3.

Figure 4:
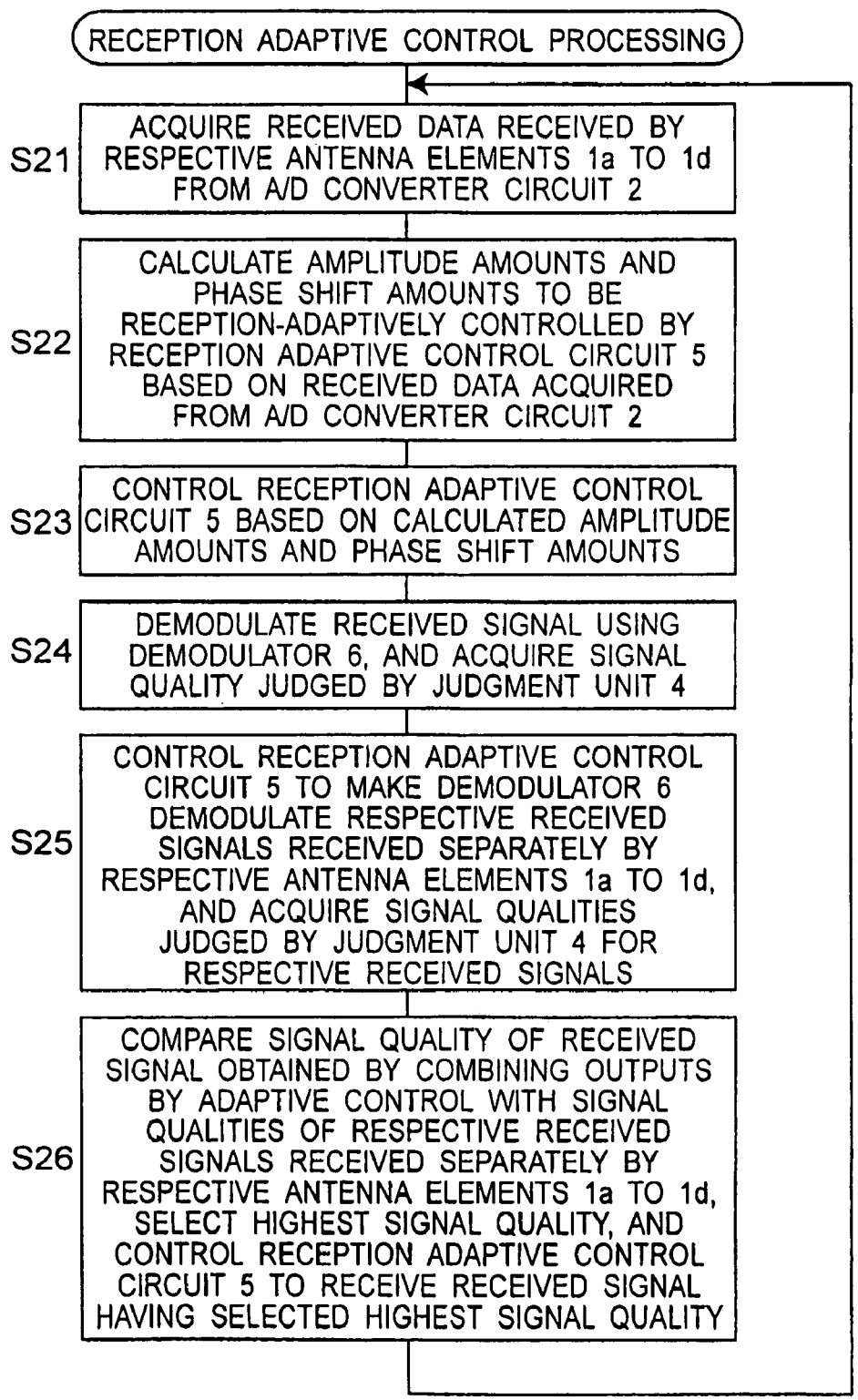
FIG. 4 is a flowchart showing a reception adaptive control processing executed by the controller 3 shown in FIG. 1 according to a second modified preferred embodiment of the first preferred embodiment of the present invention.

FIG. 4 is a flowchart showing a reception adaptive control processing executed by the controller 3 shown in FIG. 1 according to a second modified preferred embodiment of the first preferred embodiment of the present invention.

Referring to FIG. 4, first of all, at step S21, the controller 3 acquires the received data received by the respective antenna elements 1a to 1d from the A/D converter circuit 2. At step S22, the controller 3 calculates amplitude amounts and phase shift amounts to be reception-adaptively controlled by the reception adaptive control circuit 5 based on the received data acquired from the A/D converter circuit 2. At step S23, the controller 3 controls the reception adaptive control circuit 5 based on calculated amplitude amounts and phase shift amounts. At step S24, the controller 3 demodulates the received signal by the modulator 6, and acquires signal quality judged by the judgment unit 4. Further, at step S25, the controller 3 controls the reception adaptive control circuit 5 to make the demodulator 6 demodulate the respective received signals received separately by the respective antenna elements 1a to 1d, and acquires the bit error rates which are the signal qualities judged by the judgment unit 4 for the respective received signals. Further, at step S26, the controller 3 compares the signal quality of the received signal obtained by combining the outputs by the adaptive control with the signal qualities of the respective received signals received separately by the respective antenna elements 1a to 1d, and selects the highest signal quality. In addition, the controller 3 controls the reception adaptive control circuit 5 to receive a received signal having the highest signal quality.

In FIG. 4, when the control flow returns from step S26 to step S1, the controller 3 preferably waits for a predetermined time, and then, executes the same processing.

By executing the reception adaptive control processing shown in FIG. 4, the controller 3 adaptively controls with using the four antenna elements 1a to 1d, and measures the signal quality of the combined signal by the adaptive control. The controller 3 also measures the respective signal qualities of the received signals received separately by the respective antenna elements 1a to 1d. Then, the controller 3 controls the reception adaptive control circuit 5 to receive a received signal having a lowest bit error rate. Accordingly, as shown in FIGS. 22 to 29, for example, even if the radiation directivity of the antenna element 92 has the null, the interference wave (the cochannel interference wave or the delay wave) arrives from the direction of this null, and the interference wave cannot be suppressed since only the antenna element 91 receives the interference wave, it is possible to always select the received signal having the highest signal quality by executing a processing for switching over between the adaptive control and the reception of the signals separately by the respective antenna elements as shown in FIG. 4.

The three reception adaptive control processings described above with reference to FIGS. 2 to 4, respectively, will be considered below.

The reception adaptive control processing of FIG. 2 always carries out the adaptive control. This processing is suitable for high transmission rate and stable radio communication. Namely, the processing is optimum for a short-distance and high transmission rate communication in a radio LAN, a hot spot in a next-generation high transmission rate communication, or the like, which is required to have a high stability, since an amount of information such as images and moving pictures to be transmitted is large and a bit error rate is directly linked with image disturbance. In this case, because of narrow coverage of a base station, there is a high probability of presence of a cochannel interference wave from an adjacent base station. Further, because of the high transmission rate communication, a cycle time or a period time of a signal sequence to be transmitted is short. This leads to presence of a wave delayed by one signal cycle or more, and emerges as an interference wave. In this way, since there is the high probability of presence of the interference wave, this control processing that always carries out the adaptive control is suitable for the above-mentioned communication. However, this control processing has a disadvantageous problem of high power consumption, since the adaptive control is always carried out.

The reception adaptive control processing of FIG. 3 mainly carries out the reception of the signals separately by the respective antenna elements. In this case, an operation as the selection diversity is expected, and this processing is suitable for low transmission rate but stable communication. For example, this processing is suitable for such a case, where a terminal apparatus is distant from a base station, and the amount of information to be transmitted such as a telephone call is small. In this case, since a radio wave arriving at the terminal apparatus is weak, it is optimum to switch over among the respective antenna elements (selection diversity) that can stabilize the received power, rather than to suppress the interference wave. However, when an unnegligible error occurs because of presence of the interference wave, the adaptive control is carried out. This reception adaptive control processing can realize a short control cycle since an operation amount is smaller than that of the reception adaptive control processing of FIG. 2. In addition, this processing is advantageous in power consumption, since it is unnecessary to always change the amplitude amounts and the phase shift amounts for the received signals received by the respective antenna elements.

The reception adaptive control processing of FIG. 4 includes the processing shown in Fig. 2 and that shown in FIG. 3. This reception adaptive control processing compares the signal quality after the adaptive control with the signal qualities of the respective received signals received separately by the respective antenna elements by carrying out one control. Accordingly, this processing can always produce an optimum state. Namely, not only the adaptive control but also the advantageous effect of diversity described above can be expected. However, as compared with the two processings shown in FIGS. 2 and 3, an operation amount is large and the number of switchovers is large. Due to this, it is considered that it takes lots of control time. Namely, this processing needs a longer control cycle than those of the two processings of FIGS. 2 and 3. In addition, as compared with the two processings of FIGS. 2 and 3, this processing is considered to be high in power consumption. Namely, the reception adaptive control processing of FIG. 4 is suitable for a system that needs a more stable and high transmission rate communication than that the two respective processings of FIGS. 2 and 3 needs, that has a long control cycle, and that has a sufficient margin in the power consumption. For example, this processing is optimum for a high transmission rate radio LAN antenna apparatus provided in a personal computer. In this case, since the apparatus is used indoors in many cases and moved less frequently, the control cycle may be long. In addition, when moving pictures are transmitted and received through the Internet, a very high signal transmission rate is required. Further, since a personal computer is usually used while being connected to an AC power source, there is no need to be concerned about power consumption. In addition, a notebook computer or the like that serves as a mobile terminal apparatus is provided with a rechargeable battery having more battery capacity than those of the other mobile communication terminal apparatuses. For these reasons, the reception adaptive control processing of FIG. 4 is optimum for high transmission rate radio LAN required in the personal computer or the like.

Figure 5:
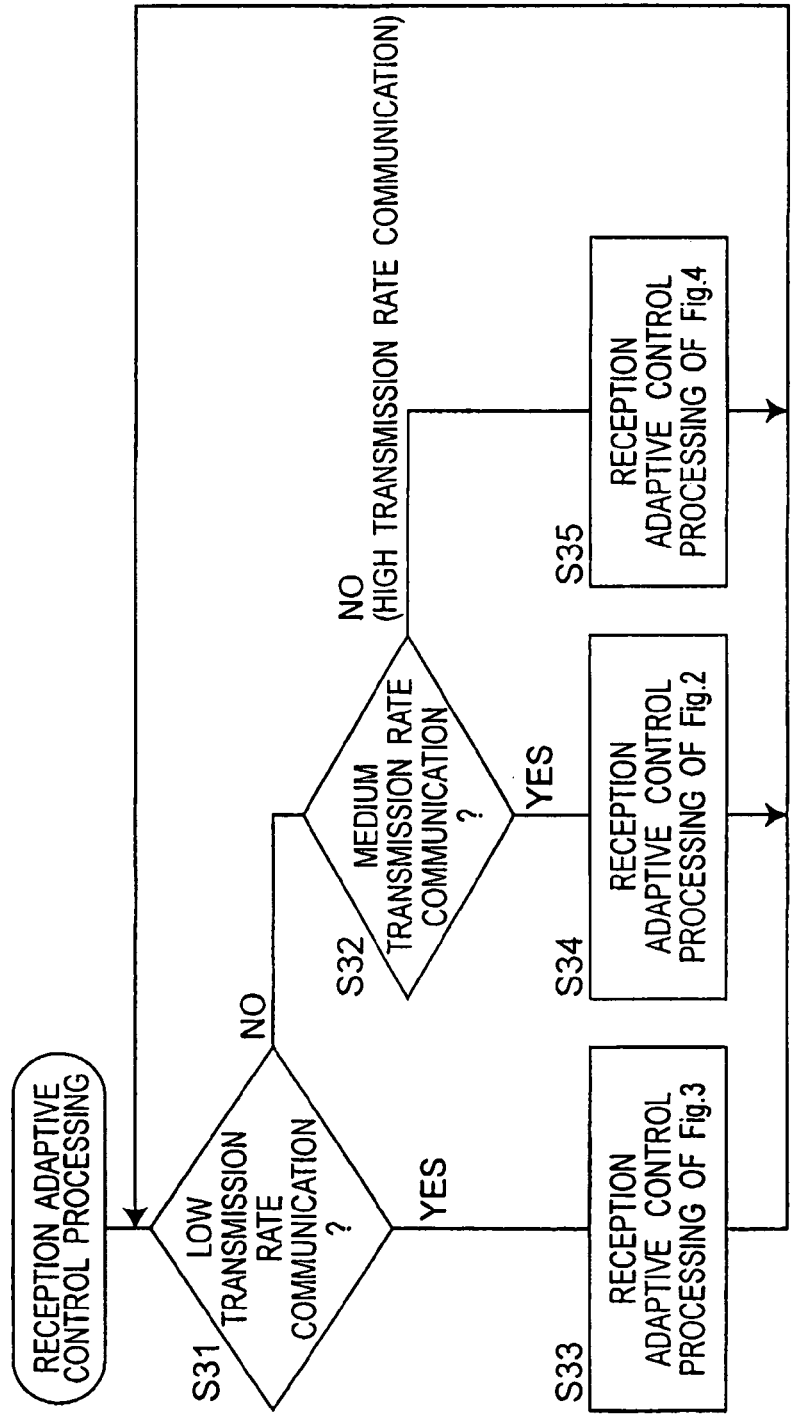
FIG. 5 is a flowchart showing a reception adaptive control processing executed by the controller 3 shown in FIG. 1 according to a third modified preferred embodiment of the first preferred embodiment of the present invention.

Further, a processing using the reception adaptive control processings of FIGS. 2 to 4 will be described hereinafter. In this processing, hardware is shared among the three processings since hardware configurations which they need are the same as each other. By switching over among these three processings according to use and the environment, a greater advantageous effect can be expected. As a switching method, it is possible to switch over among the three processings according to a transmission rate Vth of a baseband signal included in a radio signal by, for example, setting two threshold rates Vth1 and Vth2 (Vth1<Vth2), as will be described below. In this case, as shown in FIG. 5, the processing is switched over as follows:

(A) In a low transmission rate communication in which the transmission rate Vth has a relationship of Vth<Vth1 (YES at step S31), the reception adaptive control processing of FIG. 3 is executed (at step S33);

(B) In a medium transmission rate communication in which the transmission rate Vth has a relationship of Vth1≦Vth<Vth2 (YES at step S32), the reception adaptive control processing of FIG. 2 is executed (at step S34); and (C) In a high transmission rate communication in which the transmission rate Vth has a relationship of Vth≦Vth2 (NO at step S32), the reception adaptive control processing of FIG. 4 is executed (at step S35).

Namely, the processing is switched over to the processing of FIG. 3 in a telephone call, to the processing of FIG. 2 in a mobile data communication or the like, such as a communication while a user is walking, and to the processing of FIG. 4 when the user uses the Internet with the personal computer or the like. In the processing of FIG. 5, automatic switchover is possible. In addition, it is possible to switch over among the three processings, so that when the apparatus is connected to a high capacity power source, the apparatus detects the connection and switch over to the processing of FIG. 4. Further, such a configuration in which switchover is made freely by user's manual operation is possible. In this case, there is such an advantageous effect that the user can select a control method according to the user's need.

Figure 22:
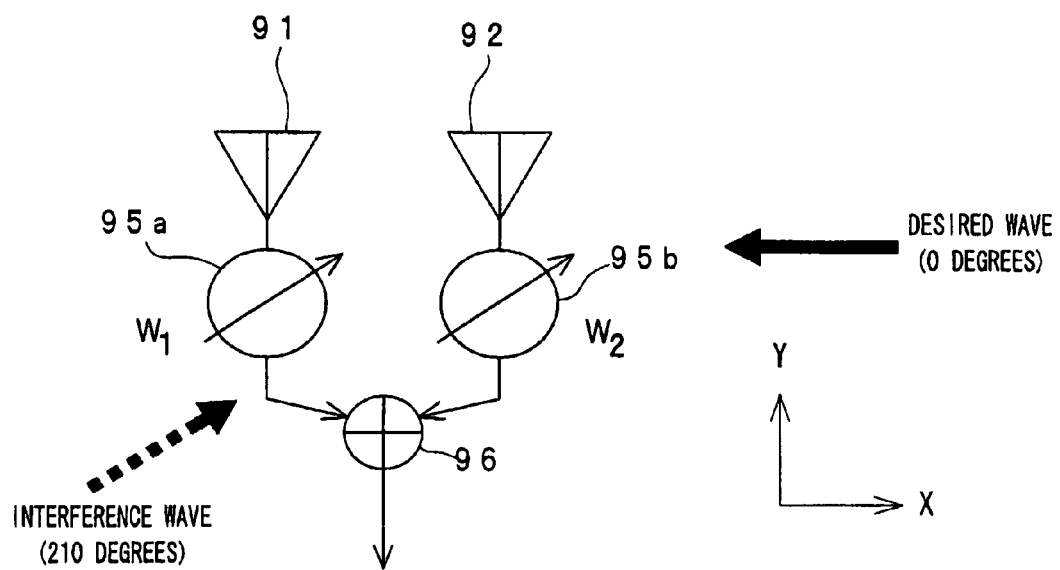
FIG. 22 is a schematic circuit diagram of the adaptive antenna apparatus showing such a case (a comparative example) that a desired wave (at zero degrees) and an interference wave (at 210 degrees) arrive at antenna elements 91 and 92 of the radio communication apparatus 90 shown in FIG. 18.
Figure 23:
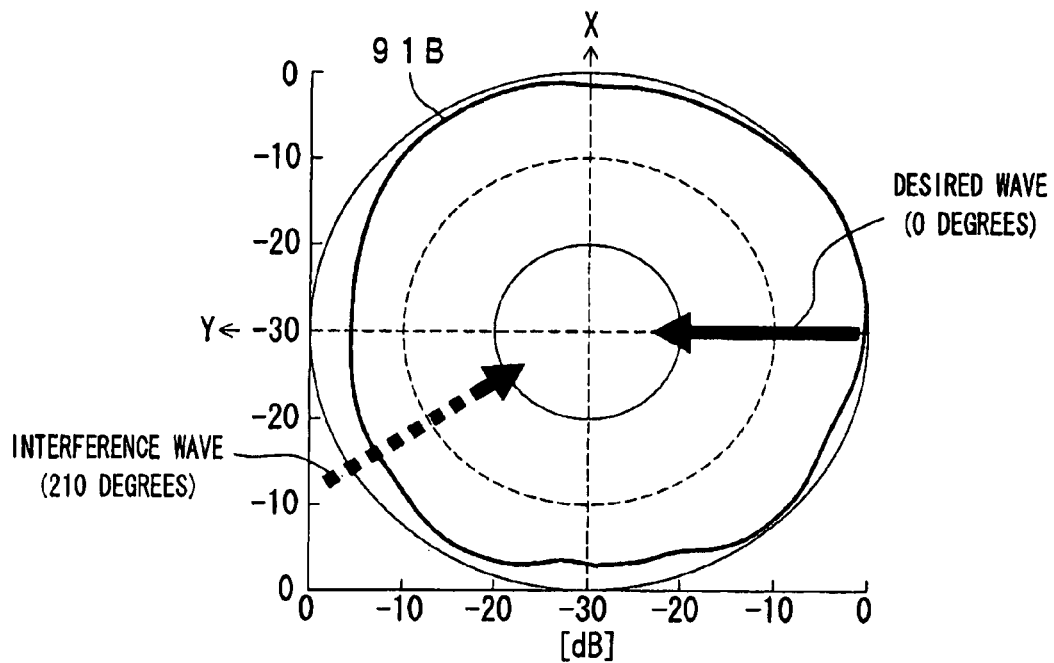
FIG. 23 is a diagram showing a directional pattern of the single antenna element 91 of the comparative example of FIG. 22.
Figure 24:
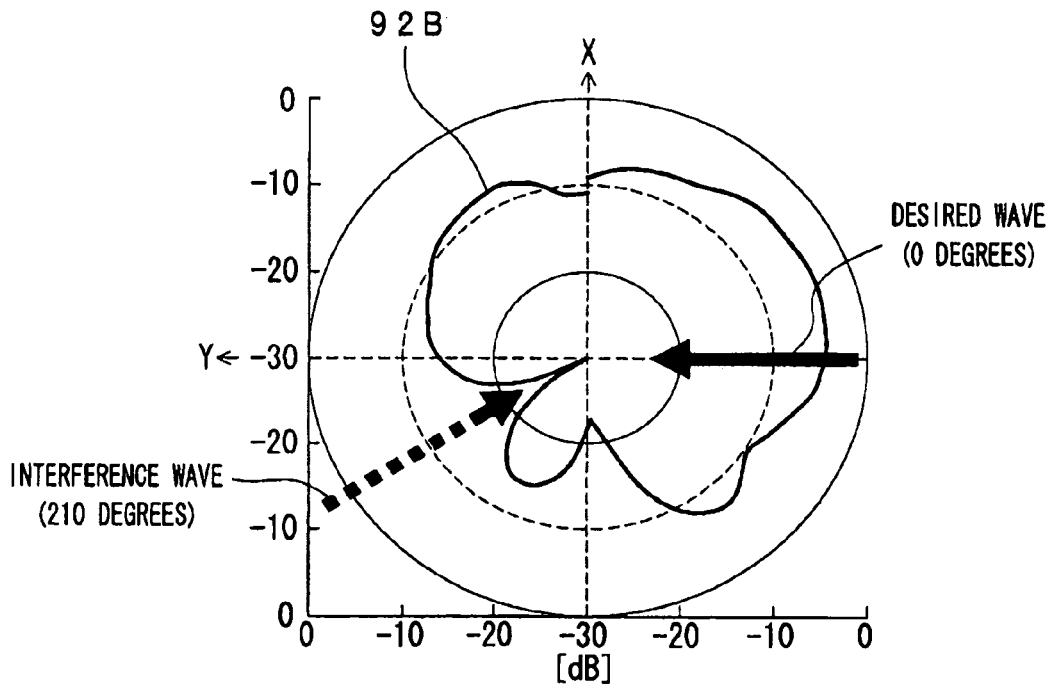
FIG. 24 is a diagram showing a directional pattern of the single antenna element 92 of the comparative example of FIG. 22.
Figure 25:
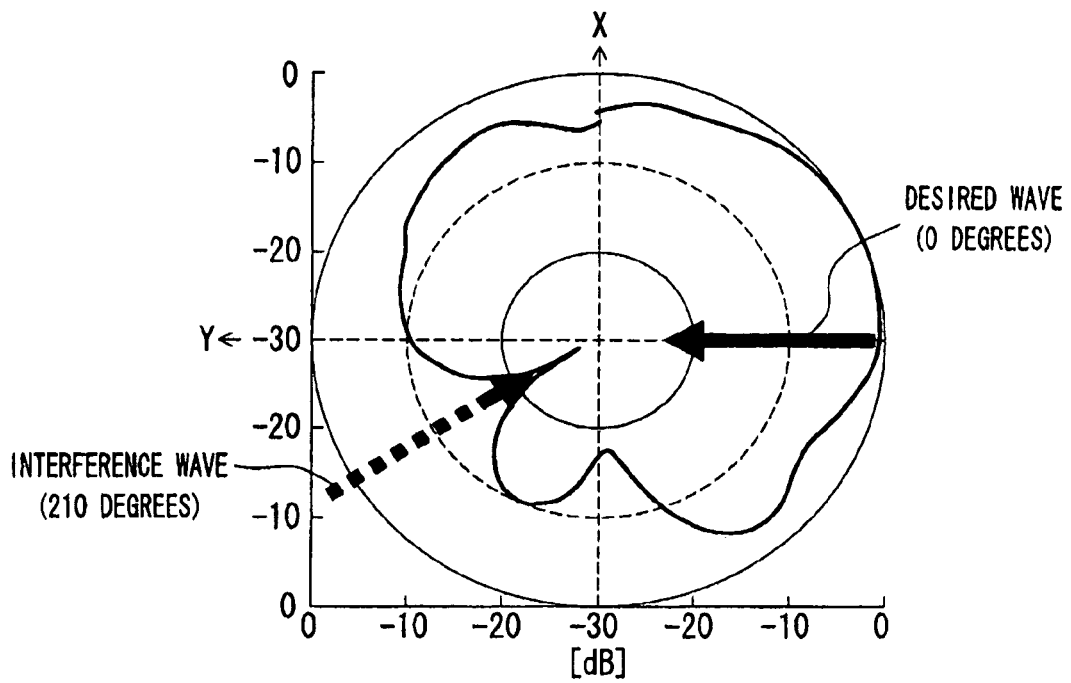
FIG. 25 is a diagram showing a directional pattern during adaptive control using the antenna elements 91 and 92 of the comparative example of FIG. 22.
Figure 26:
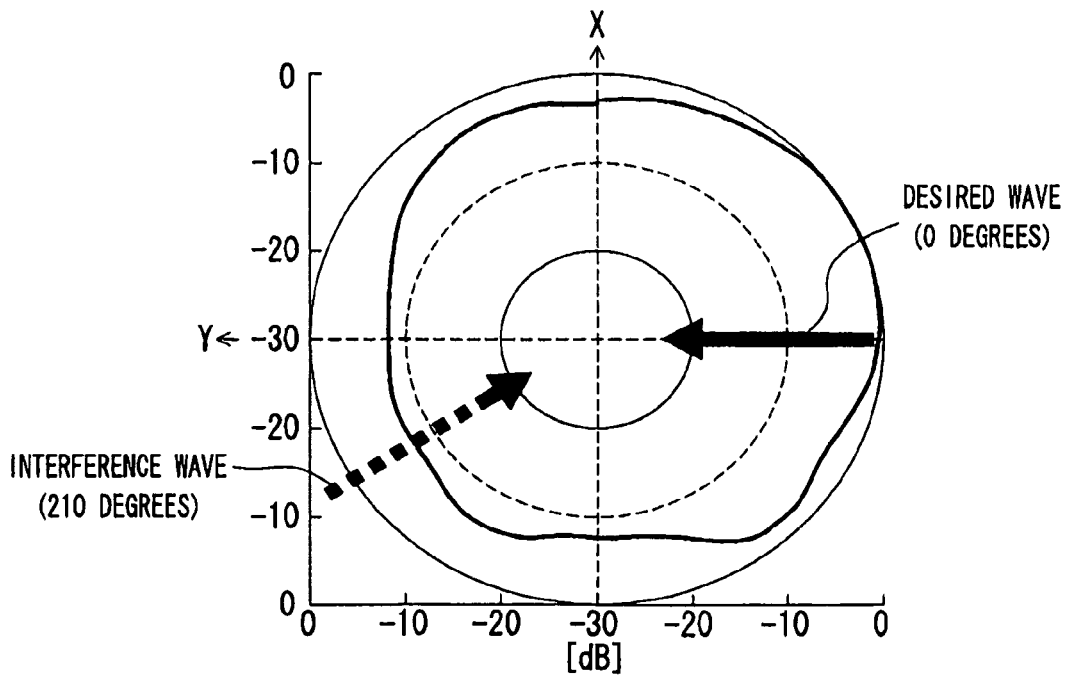
FIG. 26 is a diagram showing a directional pattern during in-phase combining using the antenna elements 91 and 92 of the comparative example of FIG. 22.
Figure 27:
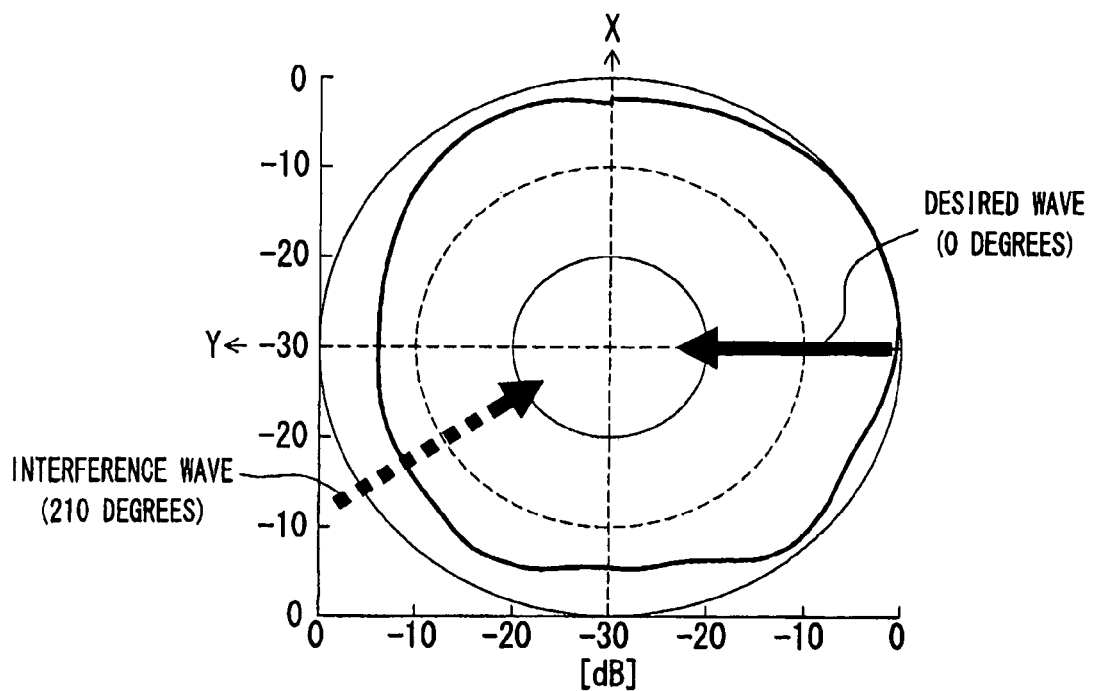
FIG. 27 is a diagram showing a directional pattern during maximal ratio combining using the antenna elements 91 and 92 of the comparative example of FIG. 22.
Figure 28:
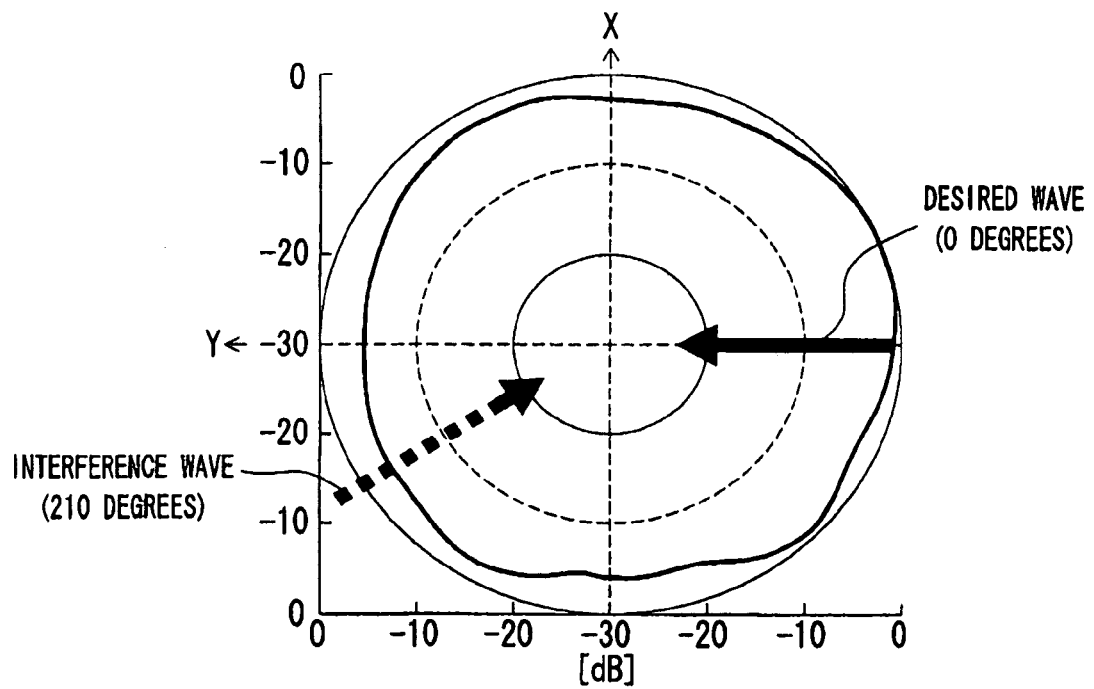
FIG. 28 is a diagram showing a directional pattern during selection diversity using the antenna elements 91 and 92 of the comparative example of FIG. 22.
Figure 30:
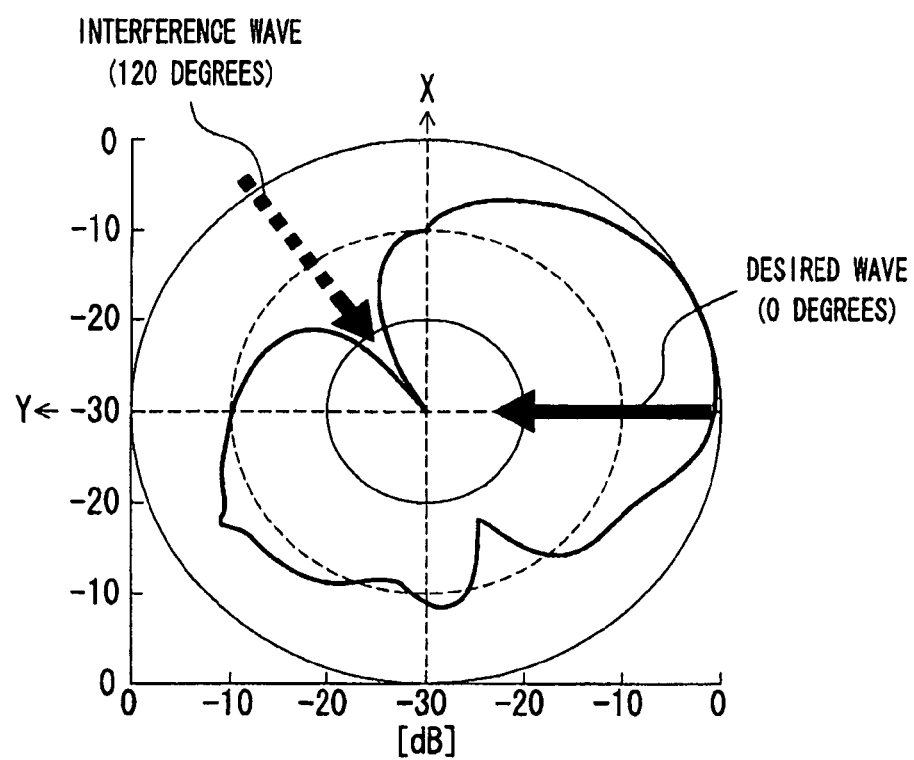
FIG. 30 is a diagram showing a directional pattern during adaptive control according to a first implemental example of the first preferred embodiment when a desired wave (at zero degrees) and an interference wave (at 120 degrees) arrive at the antenna elements 91 and 92 of the radio communication apparatus 90 shown in FIG. 22.
Figure 32:
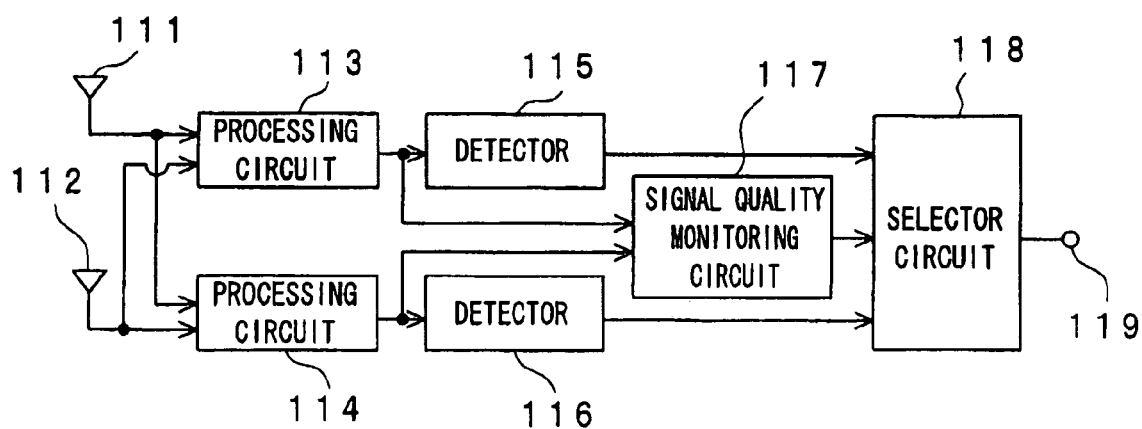
FIG. 32 is a block diagram showing a configuration of an adaptive antenna apparatus according to a prior art.

FIG. 30 is a diagram showing a directional pattern during adaptive control according to a first implemental example of the first preferred embodiment when a desired wave (zero degrees) and an interference wave (120 degrees) arrive at the antenna elements 91 and 92 of the radio communication apparatus 90 shown in FIG. 22. In addition, FIG. 31 is a table showing bit error rates of demodulated received data during respective controls according to the first implemental example shown in FIG. 30. In the first implemental example, simulation results are shown for the case where both of a desired wave direction and an interference wave direction are not null directions of the two antenna elements 91 and 92. As apparent from FIG. 30, the null can be oriented to the interference wave direction during the adaptive control. In addition, in this case, a lowest bit error rate can be obtained as shown in FIG. 31.

In the first preferred embodiment and the modified preferred embodiments of the first preferred embodiment, the highest signal quality is always obtained by comparing a signal quality of an output signal after the adaptive control using all of the antenna elements $1a$ to $1d$ with the signal qualities of the respective signals separately received by the respective antenna elements $1a$ to $1d$. However, the present invention is not limited to this, and the following control may be carried out.

For example, when the number of antenna elements is three or more as in the example of FIG. 1, it is possible to select a radio signal having the highest signal quality among signal quality of a radio signal obtained by combining the outputs by the adaptive control using all of the three or more antenna elements, signal quality of a radio signal obtained by combining the outputs by the adaptive control using a part of the three or more antenna elements, and signal qualities of the radio signals separately received by the respective antenna elements. In this case, a method for decreasing a number of antenna elements one by one when a good characteristic cannot be obtained during the judgment in the reception adaptive control processing of FIG. 2 may be considered (which will be referred to as a modified preferred embodiment of FIG. 2 hereinafter). For example, in the example of FIG. 1, judgment is made first to the adaptive control using the four antenna elements, then judgment is made to (four) cases of using the three antenna elements, then judgment is made to (six) cases of using the two antenna elements, and finally judgment is made to cases of using the respective antenna elements separately. On the other hand, a method for increasing the number of antenna elements used by the adaptive control after the judgment is made to the cases of using the respective antenna elements separately in the reception adaptive control processing of FIG. 3 may be considered (which will be referred to as a modified preferred embodiment of FIG. 3 hereinafter). In this case, the judgment is made first to the (four) cases of using the respective antenna elements separately, the judgment is made to the (six) cases of the adaptive control using the two antenna elements, then judgment is made to the (four) cases of the adaptive control using the three antenna elements, and finally judgment is made to the cases of the adaptive control using the four antenna elements. In a manner similar to that of the above, the modified example of FIG. 2 exhibits such an advantageous effect that the control time can be shortened, since the number of switchovers of the antenna elements is decreased. The modified example shown in FIG. 3 exhibits such an advantageous effect that the power consumption can be reduced, since operation amounts required for the adaptive control are unnecessary, and it is unnecessary to adjust the amplitude amounts and the phase shift amounts necessary for the adaptive control.

Second Preferred Embodiment

Figure 6:
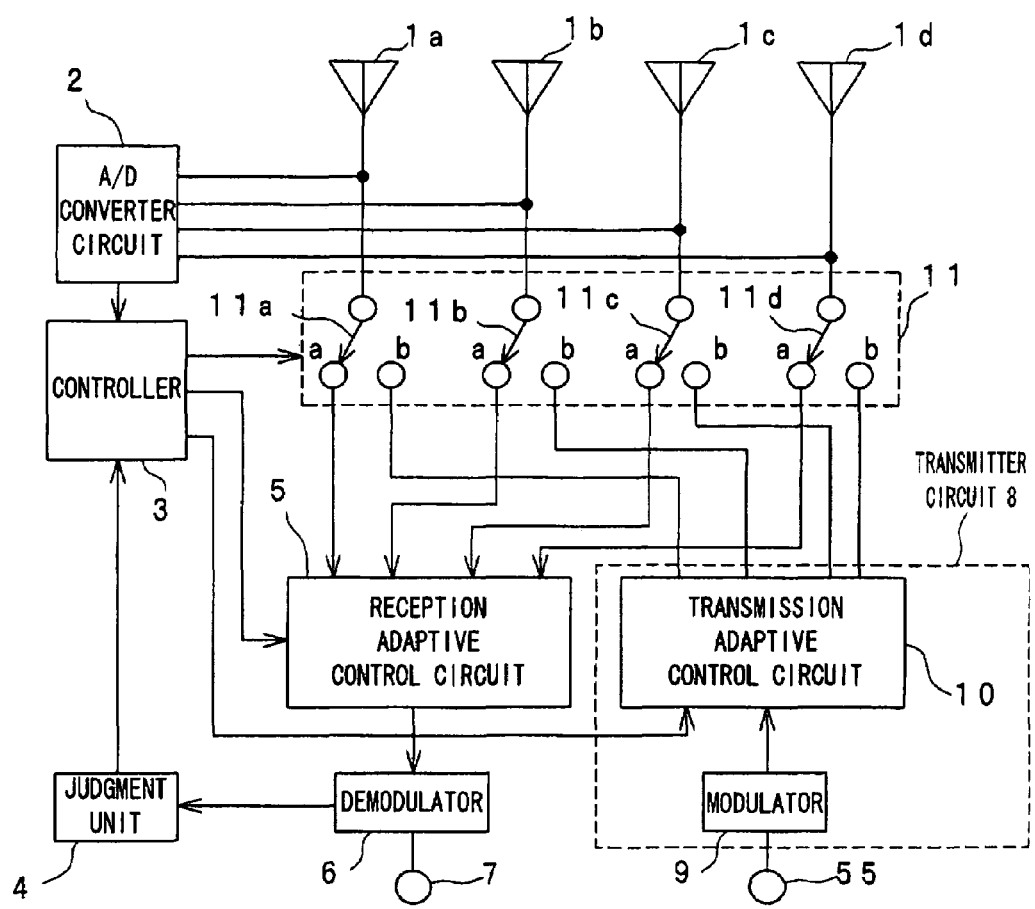
FIG. 6 is a block diagram showing a configuration of an adaptive antenna apparatus according to a second preferred embodiment of the present invention.
Figure 7:
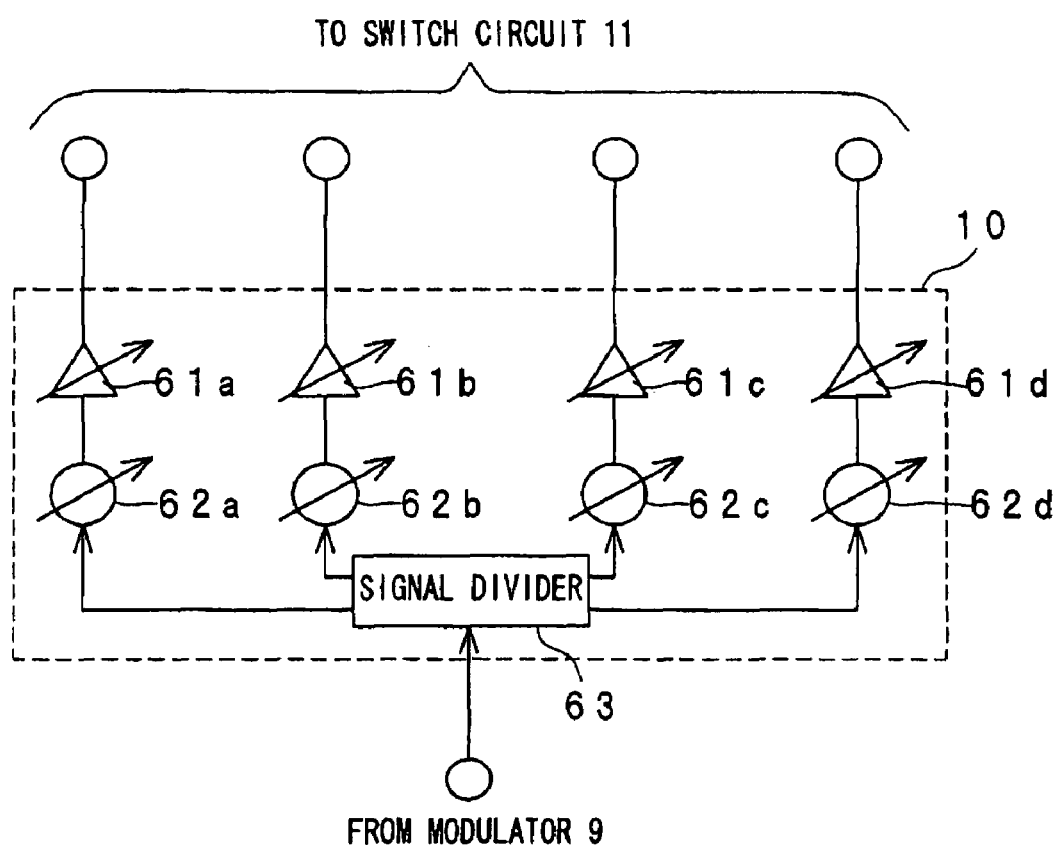
FIG. 7 is a block diagram showing a configuration of a transmission adaptive control circuit 10 shown in FIG. 6.

FIG. 6 is a block diagram showing a configuration of an adaptive antenna apparatus according to a second preferred embodiment of the present invention. FIG. 7 is a block diagram showing a configuration of a transmission adaptive control circuit 10 shown in FIG. 6. The adaptive antenna apparatus according to the second preferred embodiment is characterized, as compared with the adaptive antenna apparatus shown in FIG. 1, by further including a switch circuit 11 that includes four switches $11a$ to $11d$, a transmitter circuit 8 that includes a modulator 9 and the transmission adaptive control circuit 10, and an input terminal 55. Differences between the second preferred embodiment and the first preferred embodiment will be described in detail hereinafter.

Referring to FIG. 6, the radio signal received by the antenna element $1a$ is inputted to the reception adaptive control circuit 5 via a contact "a" side of the switch $11a$. The radio signal received by the antenna element $1b$ is inputted to the reception adaptive control circuit 5 via a contact "a" side of the switch $11b$. The radio signal received by the antenna element $1c$ is inputted to the reception adaptive control circuit 5 via a contact "a" side of the switch $11c$. The radio signal received by an antenna element $1d$ is inputted to the reception adaptive control circuit 5 via a contact "a" side of the switch $11d$. On the other hand, a baseband signal inputted via the input terminal 55 is inputted to the modulator 9. The modulator 9 modulates a carrier wave using a predetermined digital modulation method according to an inputted baseband signal, and outputs a modulated radio signal to a signal divider 63 (FIG. 7) of the transmission adaptive control circuit 10.

In the transmission adaptive control circuit 10 of FIG. 7, the signal divider 63 divides an inputted radio signal into four divided radio signals. A first divided radio signal is outputted to the antenna element $1a$ via a phase shifter $62a$, a variable gain amplifier $61a$, and a contact "b" side of the switch $11a$ shown in FIG. 6, and then, it is radiated by the antenna element $1a$. A second divided radio signal is outputted to the antenna element $1b$ via a phase shifter $62b$, a variable gain amplifier $61b$, and a contact "b" side of the switch $11b$ shown in FIG. 6, and then, it is radiated by the antenna element $1b$. A third divided radio signal is outputted to the antenna element $1c$ via a phase shifter $62c$, a variable gain amplifier $61c$, and a contact "b" side of the switch $11c$ shown in FIG. 6, and then, it is radiated by the antenna element $1c$. A fourth divided radio signal is outputted to the antenna element $1d$ via a phase shifter $62d$, a variable gain amplifier $61d$, and a contact "b" side of the switch $11d$ shown in FIG. 6, and then, it is radiated by the antenna element $1d$.

In the second preferred embodiment shown in FIG. 6, by connecting antenna elements that are not used for reception among the four antenna elements 1a to 1d to the transmitter circuit 8, signals can be simultaneously transmitted and received. In this case, by providing the transmission adaptive control circuit 10 and the modulator 9 with the transmitter circuit 8 as shown in FIG. 6, it is possible to not only carry out an adaptive control on received signals but also carry out an adaptive control on transmitted signals. In this case, information on a radio wave received by a base station of the other party for the communication should be sent back from the base station to a radio terminal apparatus. For example, sent-back information includes a bit error rate of the received signal, an arrival direction of the radio signal, a received power, and the like. Based on this information, the controller 3 controls a weighting coefficient "w" of the transmission adaptive control circuit 10 to change a direction of a transmitted radio wave, so as to maximize the received power received by the base station. With this control, such a reception adaptive control that improves signal quality in a radio communication apparatus such as a portable radio apparatus can be carried out, and such a transmission adaptive control that improves signal quality of the received signal received by the base station can be carried out. Accordingly, an improvement in signal quality of an entire system can be realized.

Third Preferred Embodiment

Figure 8:
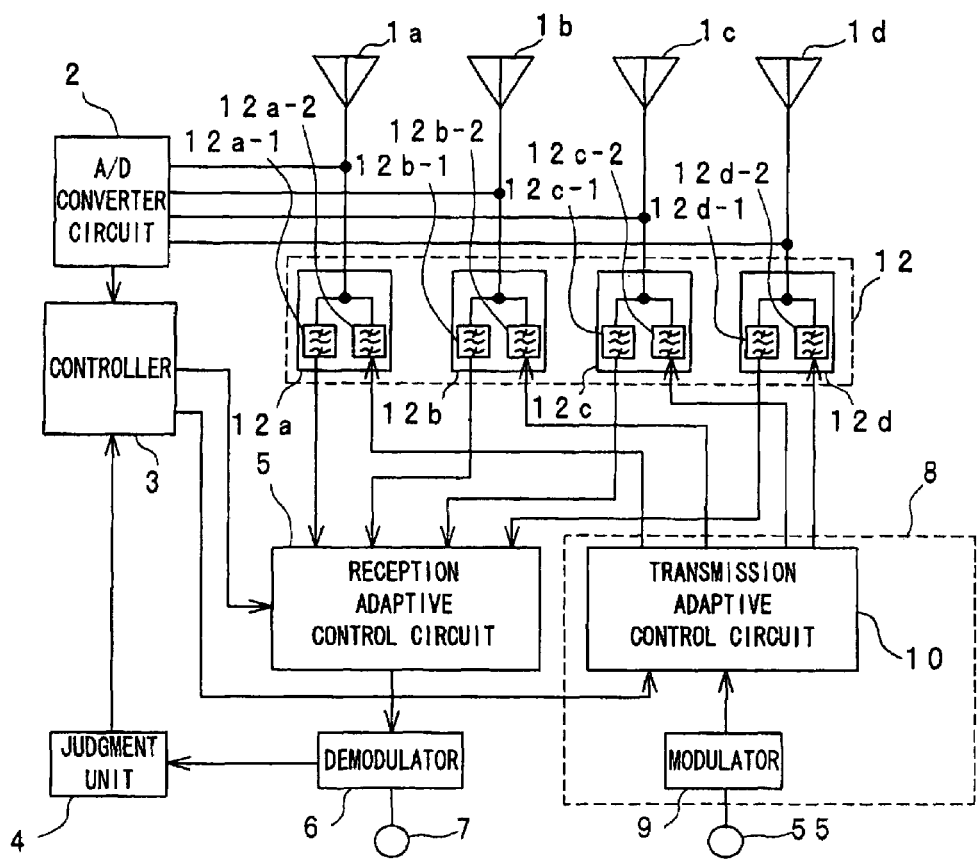
FIG. 8 is a block diagram showing a configuration of an adaptive antenna apparatus according to a third preferred embodiment of the present invention.

FIG. 8 is a block diagram showing a configuration of an adaptive antenna apparatus according to a third preferred embodiment of the present invention. The adaptive antenna apparatus according to the third preferred embodiment is characterized, as compared with the adaptive antenna apparatus according to the second preferred embodiment shown in FIG. 6, by including a duplexer circuit 12 that includes four duplexers 12a to 12d each referred to as a so-called filter sharing unit instead of the switch circuit 11.

In FIG. 8, a frequency of received signals is different from that of transmitted signal. The respective duplexers 12a to 12d bandpass-filter the received signals received by the antenna elements 1a to 1d and the transmitted signals transmitted from the antenna elements 1a to 1d, so as to discriminate the received signals from the transmitted signals. Connections between the reception adaptive control circuit 5 and the respective antenna elements 1a to 1d, and connections between the transmission adaptive control circuit 8 and the respective antenna elements 1a to 1d are discriminated according to frequency bands. Namely, the duplexer 12a includes a bandpass filter 12a-1 that bandpass-filters only the received signal, and a bandpass filter 12a-2 that bandpass-filters only the transmitted signal. In addition, the duplexer 12b includes a bandpass filter 12b-1 that bandpass-filters only the received signal, and a bandpass filter 12b-2 that bandpass-filters only the transmitted signal. Further, the duplexer 12c includes a bandpass filter 12c-1 that bandpass-filters only the received signal, and a bandpass filter 12c-2 that bandpass-filters only the transmitted signal. Still further, the duplexer 12d includes a bandpass filter 12d-1 that bandpass-filters only the received signal, and a bandpass filter 12d-2 that bandpass-filters only the transmitted signal.

In the adaptive antenna apparatus configured as described above, the received signal received by the antenna element 1a is inputted to the variable gain amplifier 51a of the reception adaptive control circuit 5 via the bandpass filter 12a-1. On the other hand, the transmitted signal from the variable gain amplifier 61a of the transmission adaptive control circuit 10 is outputted to the antenna element 1a via the bandpass filter 12a-2 and radiated by the antenna element 1a. In addition, the received signal received by the antenna element 1b is inputted to the variable gain amplifier 51b of the reception adaptive control circuit 5 via the bandpass filter 12b-1. On the other hand, the transmitted signal from the variable gain amplifier 61b of the transmission adaptive control circuit 10 is outputted to the antenna element 1b via the bandpass filter 12b-2 and radiated by the antenna element 1b. Further, the received signal received by the antenna element 1c is inputted to the variable gain amplifier 51c of the reception adaptive control circuit 5 via the bandpass filter 12c-1. On the other hand, the transmitted signal from the variable gain amplifier 61c of the transmission adaptive control circuit 10 is outputted to the antenna element 1c via the bandpass filter 12c-2 and radiated by the antenna element 1c. Still further, the received signal received by the antenna element 1d is inputted to the variable gain amplifier 51d of the reception adaptive control circuit 5 via the bandpass filter 12d-1. On the other hand, the transmitted signal from the variable gain amplifier 61d of the transmission adaptive control circuit 10 is outputted to the antenna element 1d via the bandpass filter 12d-2 and radiated by the antenna element 1d.

In the adaptive antenna element configured as described above, by using the duplexers 12a to 12d each including the two bandpass filters, it is possible to execute reception of the received signal and transmission of the transmitted signal simultaneously. Accordingly, the four antenna elements 1a to 1d can be always used for both the reception adaptive control and the transmission adaptive control. Accordingly, the best adaptive control both for reception and transmission can be carried out.

Fourth Preferred Embodiment

Figure 9:
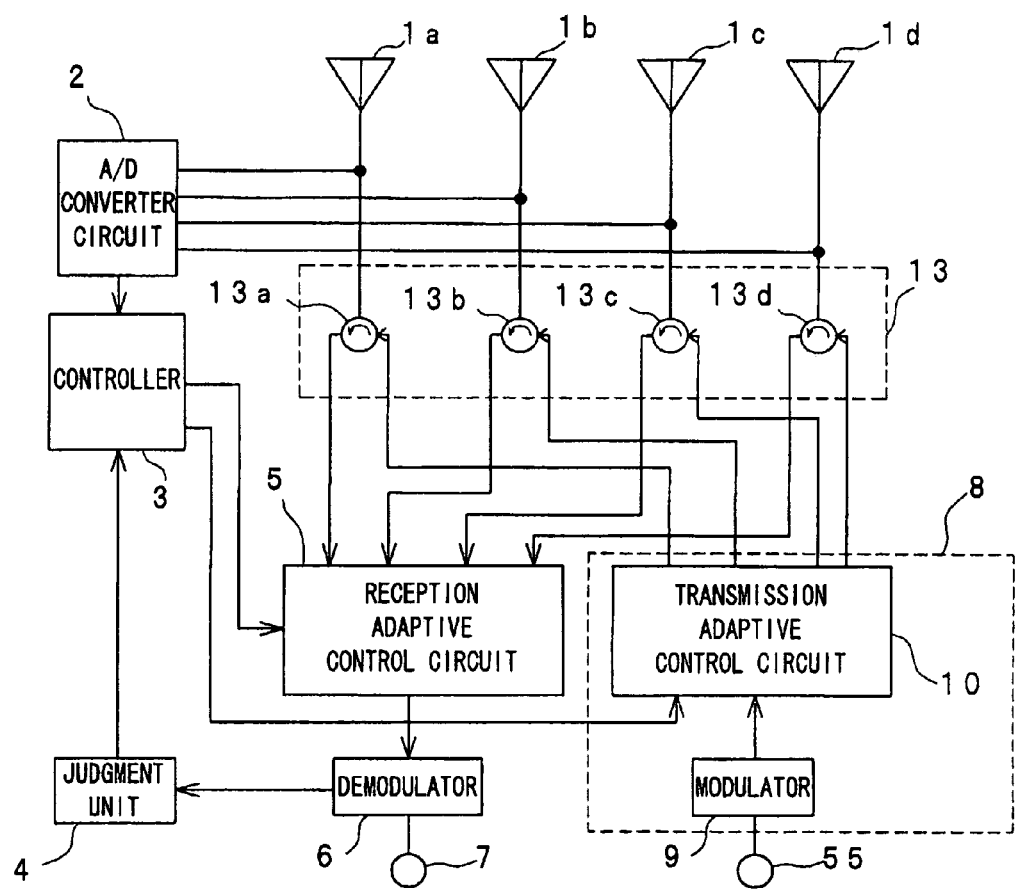
FIG. 9 is a block diagram showing a configuration of an adaptive antenna apparatus according to a fourth preferred embodiment of the present invention.

FIG. 9 is a block diagram showing a configuration of an adaptive antenna apparatus according to a fourth preferred embodiment of the present invention. The adaptive antenna apparatus according to the fourth preferred embodiment is characterized, as compared with the adaptive antenna apparatus according to the third preferred embodiment shown in FIG. 8, by including a circulator circuit 13 that includes four circulators 13a, 13b, 13c, and 13d instead of the duplexer circuit 12.

In the adaptive antenna apparatus configured as described above, the received signal received by the antenna element 1a is inputted to the variable gain amplifier 51a of the reception adaptive control circuit 5 via the circulator 13a. On the other hand, the transmitted signal from the variable gain amplifier 61a of the transmission adaptive control circuit 10 is outputted to the antenna element 1a via the circulator 13a and radiated by the antenna element 1a. In addition, the received signal received by the antenna element 1b is inputted to the variable gain amplifier 51b of the reception adaptive control circuit 5 via the circulator 13b. On the other hand, the transmitted signal from the variable gain amplifier 61b of the transmission adaptive control circuit 10 is outputted to the antenna element 1b via the circulator 13b and radiated by the antenna element 1b. Further, the received signal received by the antenna element 1c is inputted to the variable gain amplifier 51c of the reception adaptive control circuit 5 via the circulator 13c. On the other hand, the transmitted signal from the variable gain amplifier 61c of the transmission adaptive control circuit 10 is outputted to the antenna element 1c via the circulator 13c and radiated by the antenna element 1c. Sill further, the received signal received by the antenna element 1d is inputted to the variable gain amplifier 51d of the reception adaptive control circuit 5 via the circulator 13d. On the other hand, the transmitted signal from the variable gain amplifier 61d of the transmission adaptive control circuit 10 is outputted to the antenna element 1d via the circulator 13d and radiated from the antenna element 1d.

In the adaptive antenna apparatus configured as described above, by using the circulator circuit 13 including the duplexers 13a to 13d, it is possible to execute reception of the received signal and transmission of the transmitted signal simultaneously, in a manner similar to that of the third preferred embodiment. Accordingly, the four antenna elements 1a to 1d can be always used for both the reception adaptive control and the transmission adaptive control. Accordingly, best adaptive control both for reception and transmission can be carried out.

Fifth Preferred Embodiment

Figure 10:
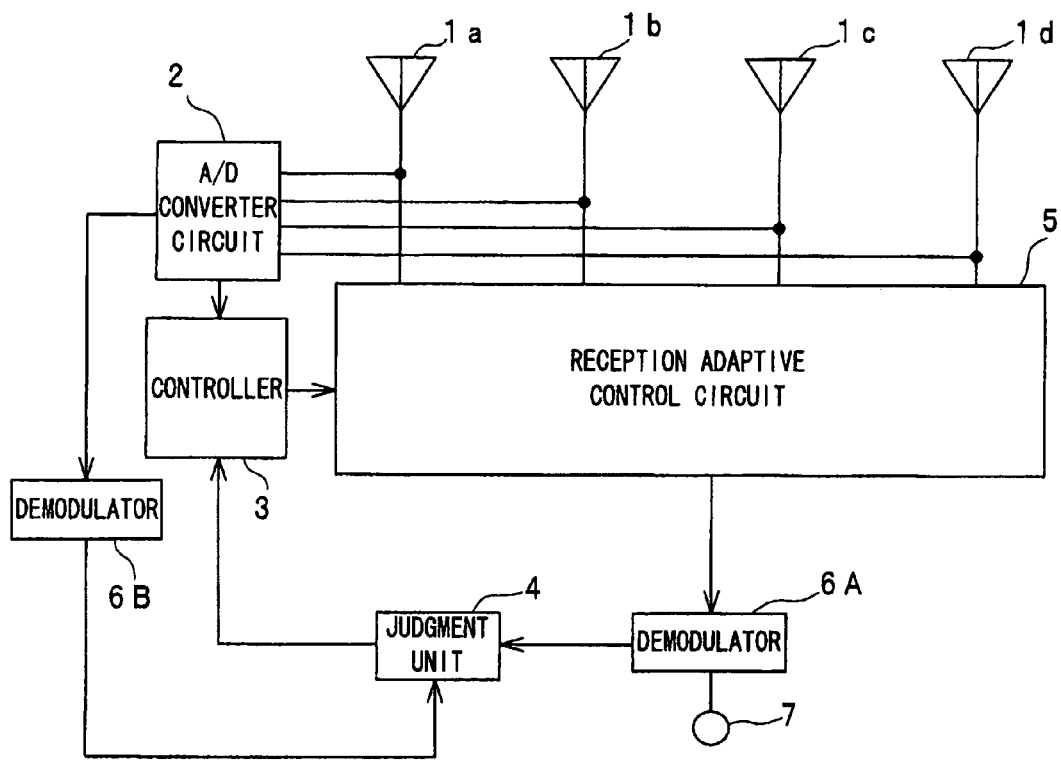
FIG. 10 is a block diagram showing a configuration of an adaptive antenna apparatus according to a fifth preferred embodiment of the present invention.

FIG. 10 is a block diagram showing a configuration of an adaptive antenna apparatus according to a fifth preferred embodiment of the present invention. The adaptive antenna apparatus according to the fifth preferred embodiment is characterized, as compared with the adaptive antenna apparatus according to the first preferred embodiment shown in FIG. 1, by including a demodulator 6B that demodulates digital signals obtained by converting the respective radio signals received by respective antenna elements 1a to 1d into the digital signals by the A/D converter circuit 2, into baseband signals, and that outputs the baseband signals to the judgment unit 4, in addition to a demodulator 6A (corresponding to the demodulator 6 shown in FIG. 1) that demodulates the radio signal from the reception adaptive control circuit 5. In this case, the judgment unit 4 judges a bit error rate of a baseband signal that is obtained by the adaptive control and outputted from the demodulator 6A, and those of the baseband signals that are outputted from the demodulator 6B and corresponding to the respective radio signals separately received by the respective antenna elements 1a to 1d. Then, the judgment unit 4 outputs information on the radio signal having the lowest or best bit error rate to the controller 3, and the controller 3 controls the reception adaptive control circuit 5 so as to receive the radio signal having the lowest or best bit error rate.

According to the above-mentioned configuration, it is unnecessary to switch over between the adaptive control and the reception of the radio signals separately, and control time required by the controller 3 can be shortened. Further, by increasing a number of the demodulators so as to decrease a number of switchovers among the reception by the respective antenna elements, it is possible to further accelerate control. In addition, by providing demodulators 6B (each of which demodulates the radio signals received by the respective antenna elements 1a to 1d) as many as the number of antenna elements and the demodulator 6A for reception adaptive control output, simultaneous demodulation without any switchovers can be realized. When there is little margin in the control time, such a configuration is preferable.

Sixth Preferred Embodiment

Figure 11:
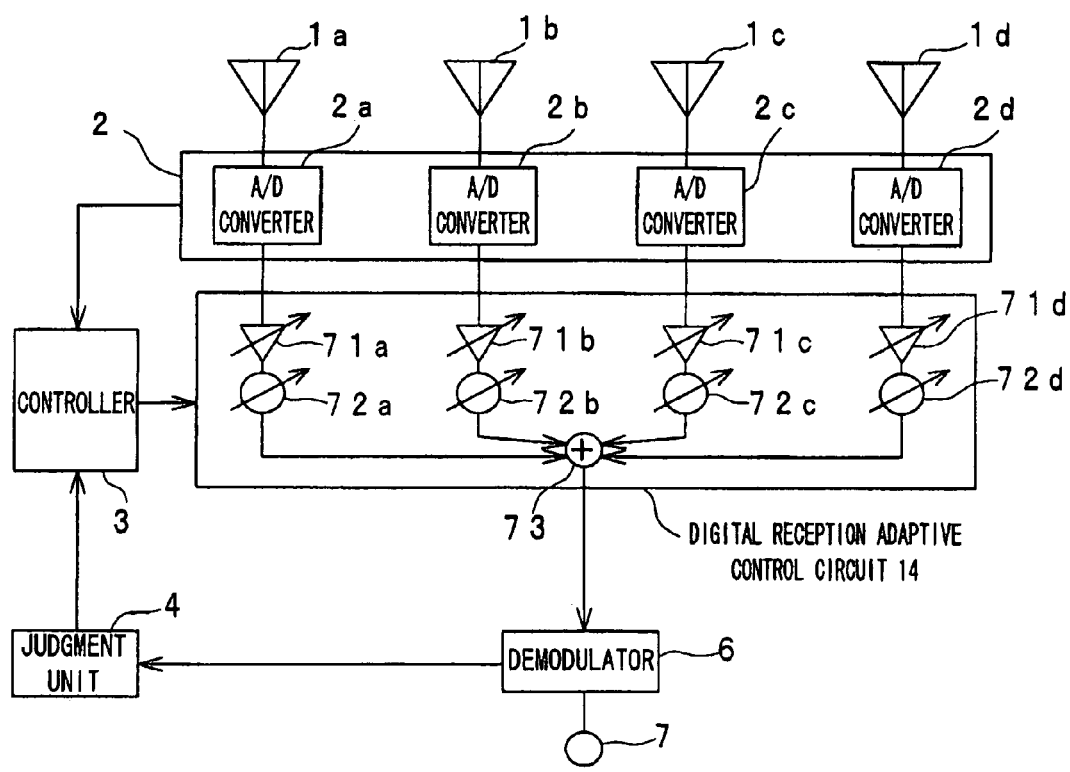
FIG. 11 is a block diagram showing a configuration of an adaptive antenna apparatus according to a sixth preferred embodiment of the present invention.

FIG. 11 is a block diagram showing a configuration of an adaptive antenna apparatus according to a sixth preferred embodiment of the present invention. The adaptive antenna apparatus according to the sixth preferred embodiment is characterized, as compared with the adaptive antenna apparatus according to the first preferred embodiment shown in FIG. 1, by inserting the A/D converter circuit 2 and a digital reception adaptive control circuit 14 between the four antenna elements 1a to 1d and the demodulator 6.

Referring to FIG. 11, the digital reception adaptive control circuit 14 is configured by including four variable gain amplifiers 71a to 71d, phase shifters 72a to 72d, and a signal combiner 73. The digital reception adaptive control circuit 14 is a digital circuit made from the reception adaptive control circuit 13, and an operation of the digital reception adaptive control circuit 14 is controlled by the controller 3. The radio signal received by the antenna element 1a is converted into a digital signal by an A/D converter 2a, and outputted to the signal combiner 73 via the variable gain amplifier 71a and the phase shifter 72a. The radio signal received by the antenna element 1b is converted into a digital signal by an A/D converter 2b, and outputted to the signal combiner 73 via the variable gain amplifier 71b and the phase shifter 72b. The radio signal received by the antenna element 1c is converted into a digital signal by an A/D converter 2c, and outputted to the signal combiner 73 via the variable gain amplifier 71c and the phase shifter 72c. The radio signal received by the antenna element 1d is converted into a digital signal by an A/D converter 2d, and outputted to the signal combiner 73 via the variable gain amplifier 71d and the phase shifter 72d. The signal combiner 73 adds up and combines inputted digital radio signals, and outputs a resultant combined signal to the demodulator 6.

According to the above-mentioned configuration, digital signal processings are performed including a demodulation processing and an adaptive control processing. Accordingly, it is possible to integrates circuits of the adaptive antenna apparatus into an IC, simplify a circuit configuration, and manufacture the apparatus at low cost.

Seventh Preferred Embodiment

Figure 12:
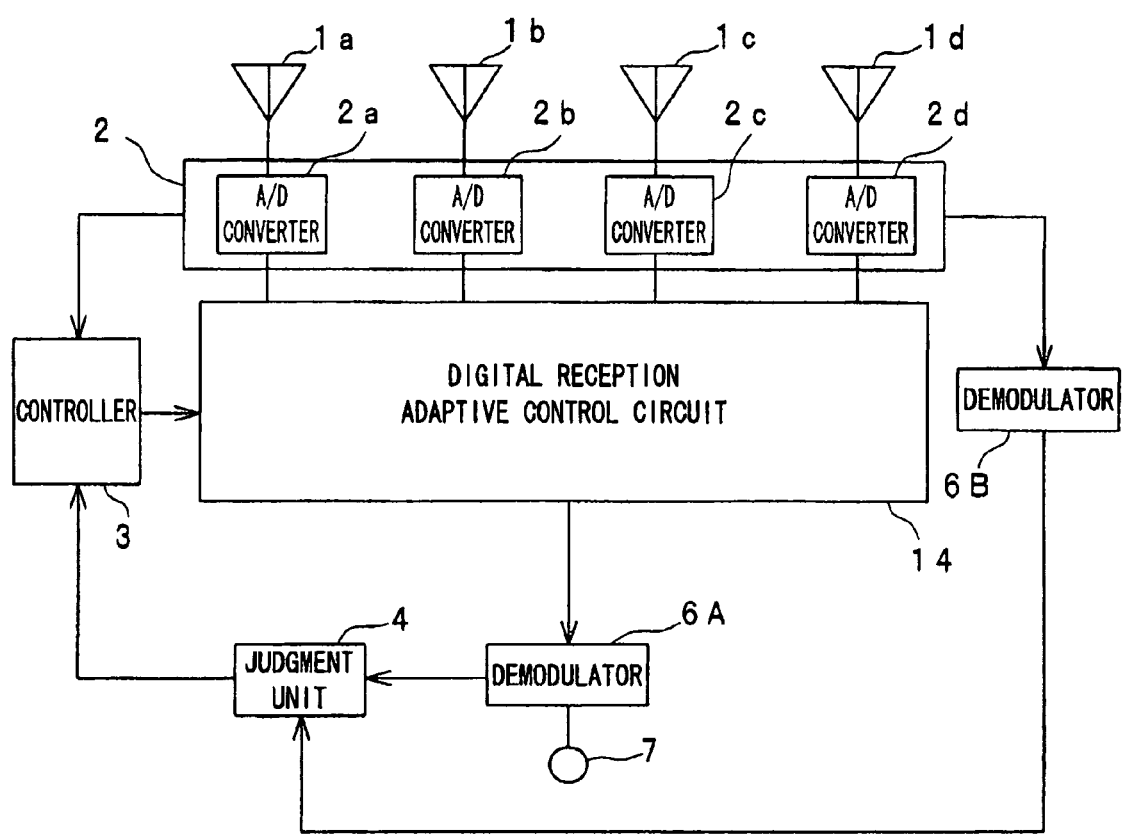
FIG. 12 is a block diagram showing a configuration of an adaptive antenna apparatus according to a seventh preferred embodiment of the present invention.

FIG. 12 is a block diagram showing a configuration of an adaptive antenna apparatus according to a seventh preferred embodiment of the present invention. The adaptive antenna apparatus according to the seventh preferred embodiment is characterized, as compared with the adaptive antenna apparatus according to the sixth preferred embodiment shown in FIG. 11, by including by including the demodulator 6B that demodulates the digital signals obtained by converting the respective radio signals received by respective antenna elements 1a to 1d into the digital signals by the A/D converter circuit 2, into the baseband signals, and that outputs the baseband signals to the judgment unit 4, in addition to the demodulator 6A (corresponding to the demodulator 6 shown in FIG. 1) that demodulates the radio signal from the reception adaptive control circuit 5, in a manner similar to that of the fifth preferred embodiment shown in FIG. 10. In this case, the judgment unit 4 judges the bit error rate of the baseband signal that is obtained by the adaptive control and outputted from the demodulator 6A, and those of the baseband signals that is outputted from the demodulator 6B and corresponding to the respective radio signals separately received by the respective antenna elements 1a to 1d. Then, the judgment unit 4 outputs information on a radio signal having a lowest bit error rate to the controller 3, and the controller 3 controls the digital reception adaptive control circuit 14 so as to receive the radio signal having the lowest bit error rate.

According to the above-mentioned configuration, it is unnecessary to switch over between the adaptive control and the reception of the radio signals separately, and control time required by the controller 3 can be shortened. Further, by increasing a number of the demodulators so as to decrease a number of switchovers among the reception by the respective antenna elements, it is possible to further accelerate control. In addition, by providing demodulators 6B (each of which demodulates the radio signals received by the respective antenna elements 1a to 1d) as many as the number of antenna elements and the demodulator 6A for reception adaptive control output, simultaneous demodulation without any switchovers can be realized. When there is little margin in the control time, such a configuration is preferable.

Eighth Preferred Embodiment

Figure 13:
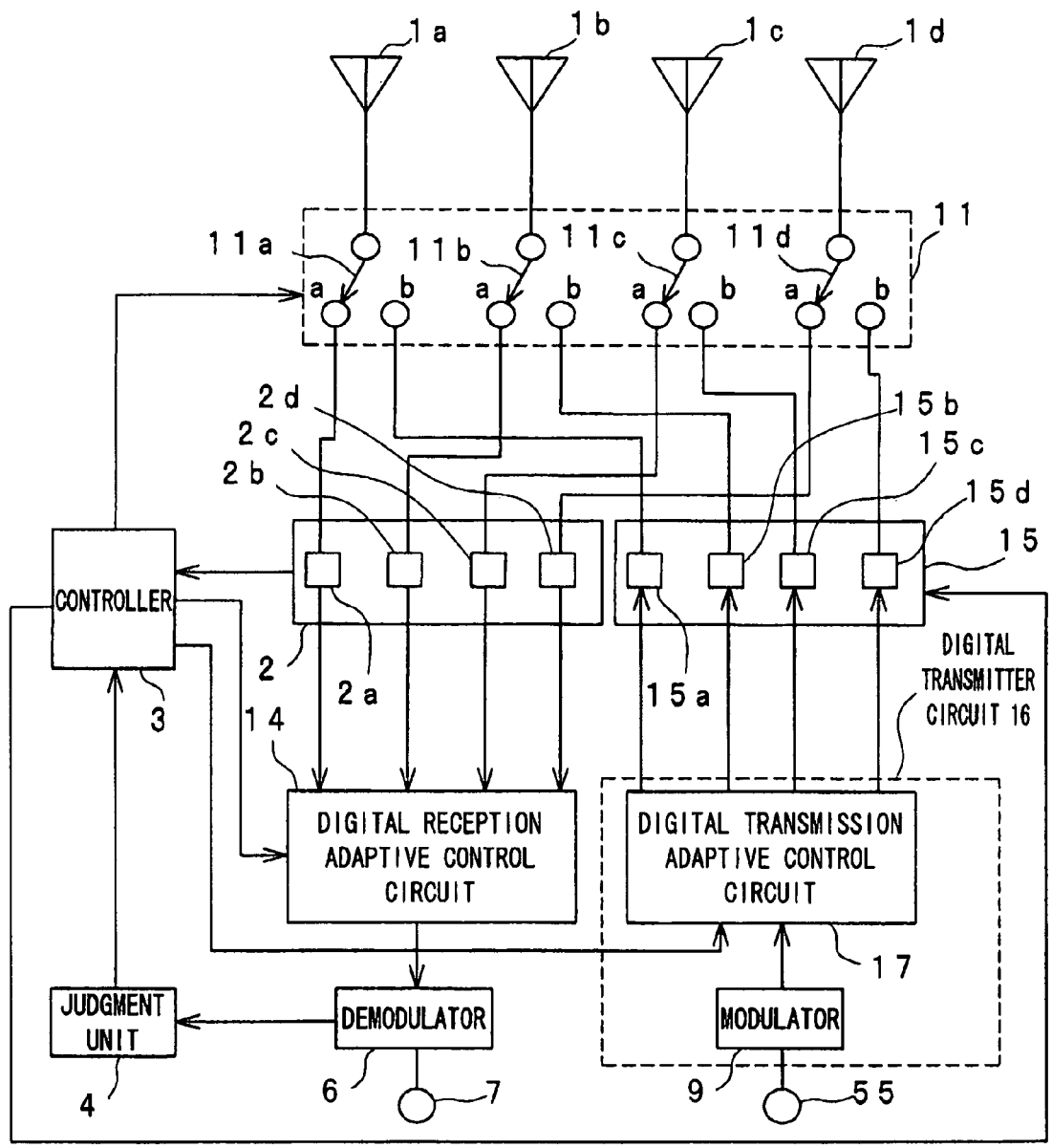
FIG. 13 is a block diagram showing a configuration of an adaptive antenna apparatus according to an eighth preferred embodiment of the present invention.
Figure 14:
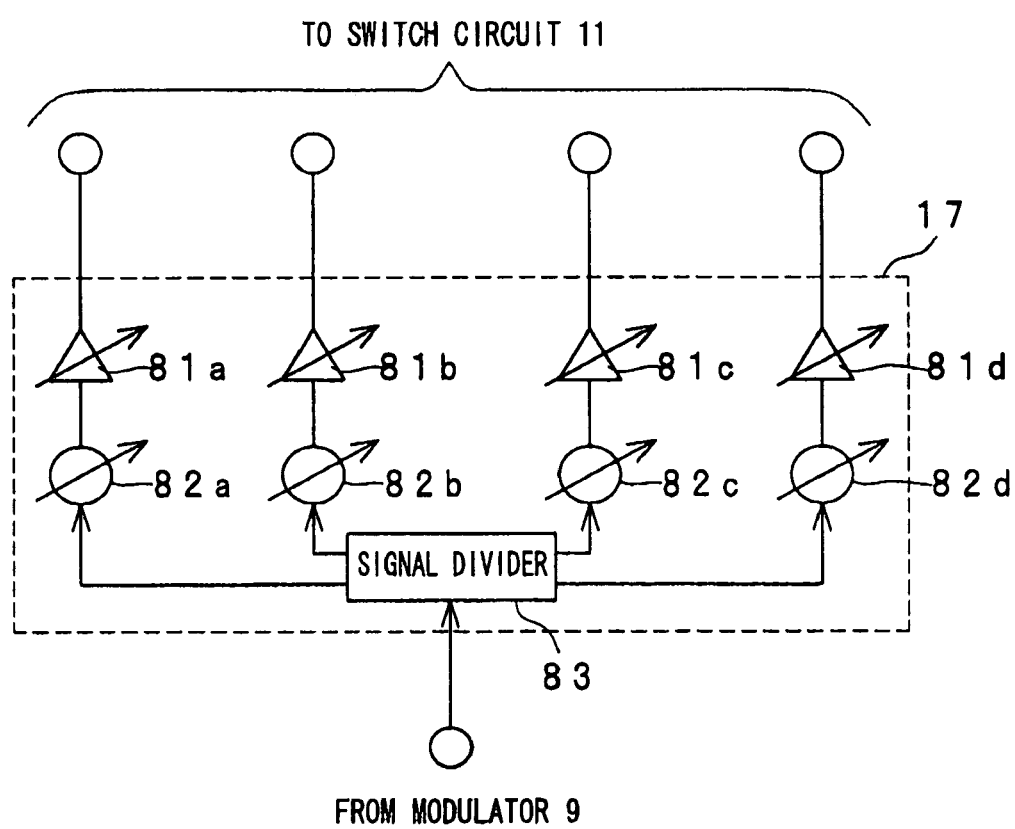
FIG. 14 is a block diagram showing a digital transmission adaptive control circuit 17 shown in FIG. 13.

FIG. 13 is a block diagram showing a configuration of an adaptive antenna apparatus according to an eighth preferred embodiment of the present invention. FIG. 14 is a block diagram showing a configuration of a digital transmission adaptive control circuit 17 shown in FIG. 13. The adaptive antenna apparatus according to the eighth preferred embodiment is different from the adaptive antenna apparatus according to the second preferred embodiment show in FIG. 6 in the following points:

(1) the digital reception adaptive control circuit 14 is provided instead of the reception adaptive control circuit 5;

(2) a digital transmitter circuit 16 including a digital transmission adaptive control circuit 17 is and a modulator 9 is provided instead of the transmitter circuit 8 including the transmission adaptive control circuit 10 and the modulator 9;

(3) the A/D converter circuit 2 including the four A/D converters 2a to 2d is inserted between the switch circuit 11 and the digital reception adaptive control circuit 14; and (4) a D/A converter circuit 15 including four D/A converters 15a to 15d is inserted between the switch circuit 11 and the digital transmission adaptive control circuit 17.

As shown in FIG. 14, in a manner similar to FIG. 7, the digital transmission adaptive control circuit 17 is configured by including four variable gain amplifiers 81a to 81d, four phase shifters 82a to 82d, and a signal combiner 83.

As shown in FIG. 13, by connecting antenna that are not used for reception among the antennas to the digital transmitter circuit 16 using the switch 11, the radio signals can be simultaneously transmitted and received. Further, by providing the digital transmission adaptive control circuit 17 and the modulator 9 with the digital transmitter circuit 16, it is possible to not only carry out a digital adaptive control on received signals but also carry out a digital adaptive control on transmitted signals. In this case, information on a radio wave received by a base station of the other party for the communication should be sent back from the base station to a radio terminal apparatus. For example, sent-back information includes a bit error rate of the received signal, an arrival direction of the radio signal, a received power, and the like. Based on this information, the controller 3 controls a weighting coefficient of the digital transmission adaptive control circuit 16 to change a direction of a transmitted radio wave, so as to maximize the received power received by the base station. With this control, such a digital reception adaptive control that improves signal quality in a radio communication apparatus such as a portable radio apparatus can be carried out, and such a digital transmission adaptive control that improves signal quality of the received signal received by the base station can be carried out. Accordingly, an improvement in the signal quality of the entire system can be realized. Still further, by making both the reception adaptive control circuit and the transmission adaptive control circuit from the digital circuits, these control circuits can be integrated into an IC. Accordingly, it is possible to make circuits small in size and reduce the manufacturing cost.

Ninth Preferred Embodiment

Figure 15:
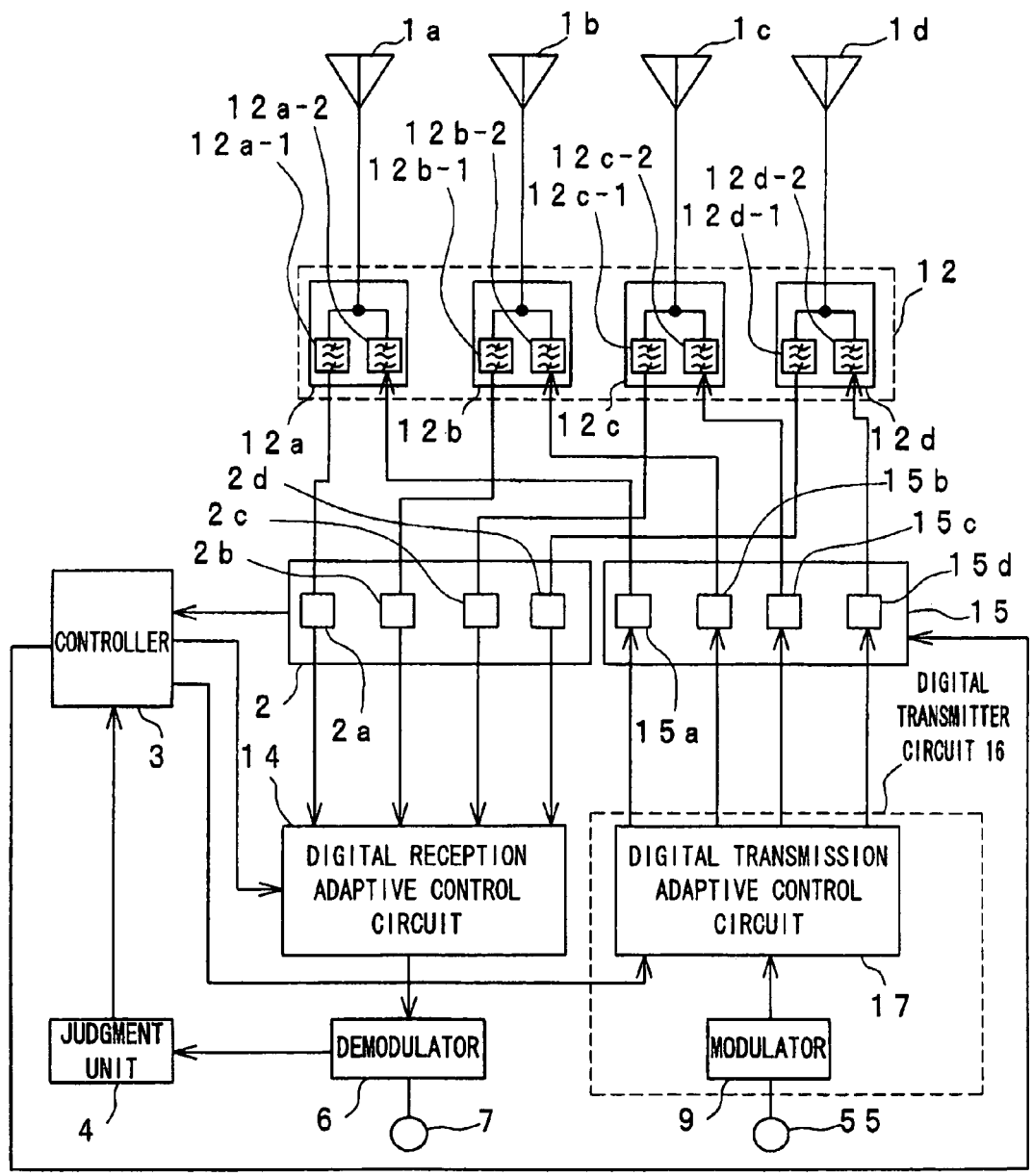
FIG. 15 is a block diagram showing a configuration of an adaptive antenna apparatus according to a ninth preferred embodiment of the present invention.

FIG. 15 is a block diagram showing a configuration of an adaptive antenna apparatus according to a ninth preferred embodiment of the present invention. The adaptive antenna apparatus according to the ninth preferred embodiment is characterized, as compared with the adaptive antenna apparatus according to the eighth preferred embodiment shown in FIG. 13, by replacing the switch circuit 11 by the duplexer circuit 12. Functions and advantageous effects resulting from this replacement are similar to those of the third preferred embodiment shown in FIG. 8. Namely, when the frequency of the received signal is different from that of the transmitted signal, by using the duplexer circuit 12, it is possible to execute reception of the received signal and transmission of the transmitted signal simultaneously. Accordingly, the four antenna elements 1a to 1d can be always used for both the digital reception adaptive control and the digital transmission adaptive control. Accordingly, the best adaptive control both for reception and transmission can be carried out.

Tenth Preferred Embodiment

Figure 16:
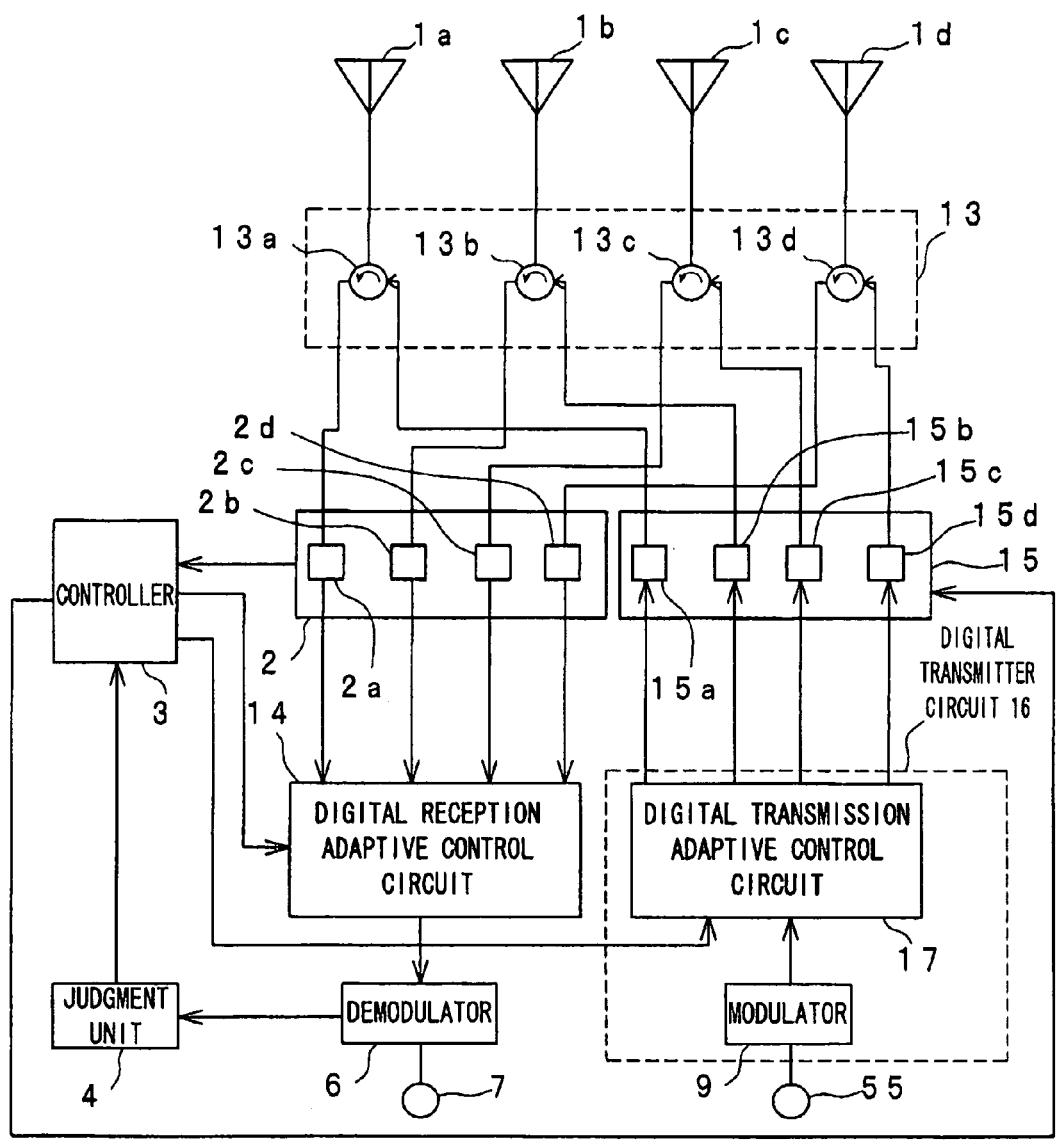
FIG. 16 is a block diagram showing a configuration of an adaptive antenna apparatus according to a tenth preferred embodiment of the present invention.

FIG. 16 is a block diagram showing a configuration of an adaptive antenna apparatus according to a tenth preferred embodiment of the present invention. The adaptive antenna apparatus according to the tenth preferred embodiment is characterized, as compared with the adaptive antenna apparatus according to the ninth preferred embodiment shown in FIG. 15, by replacing the duplexer circuit 12 by the circulator circuit 13. Functions and advantageous effects resulting from this replacement are similar to those of the fourth preferred embodiment shown in FIG. 9.

Eleventh Preferred Embodiment

Figure 17:
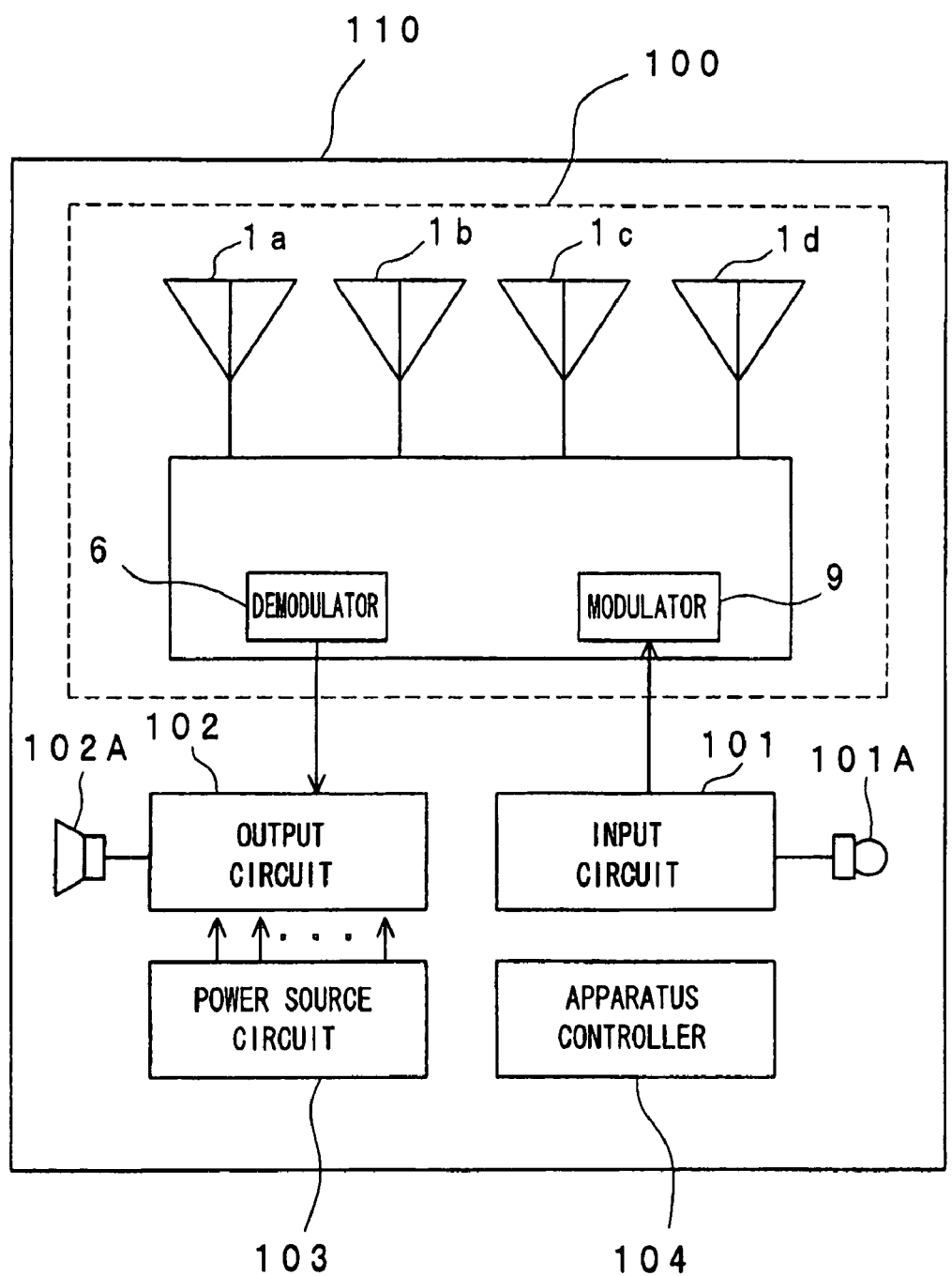
FIG. 17 is a block diagram showing a configuration of a radio communication apparatus 110 according to an eleventh preferred embodiment of the present invention including an adaptive antenna apparatus 100.
Figure 18:
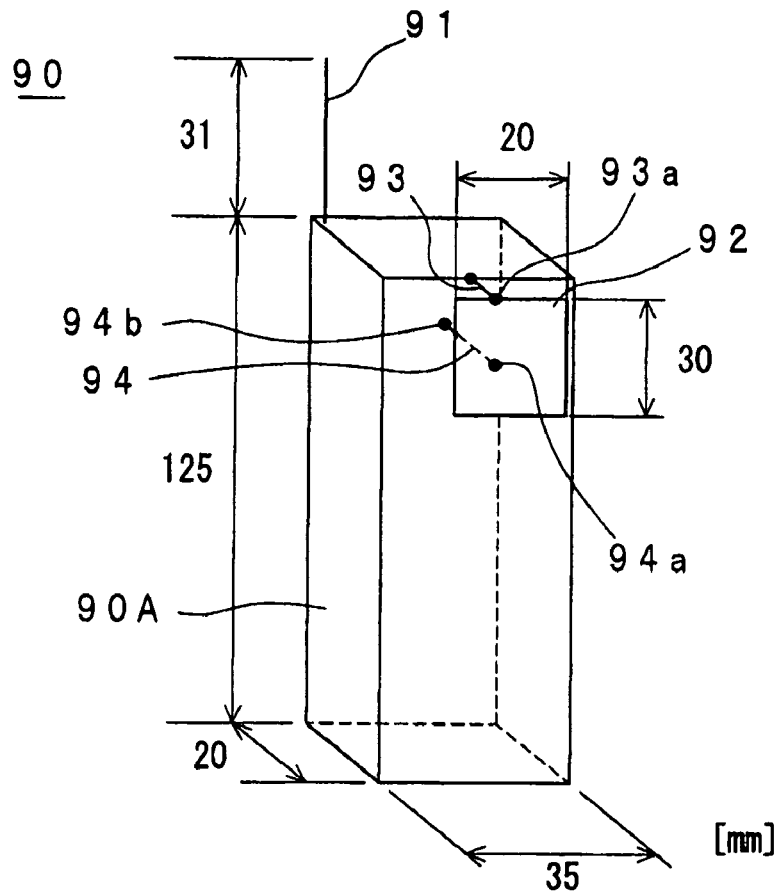
FIG. 18 is an oblique view showing an external appearance of a radio communication apparatus 90 provided with an adaptive antenna apparatus according to a comparative example.
Figure 19:
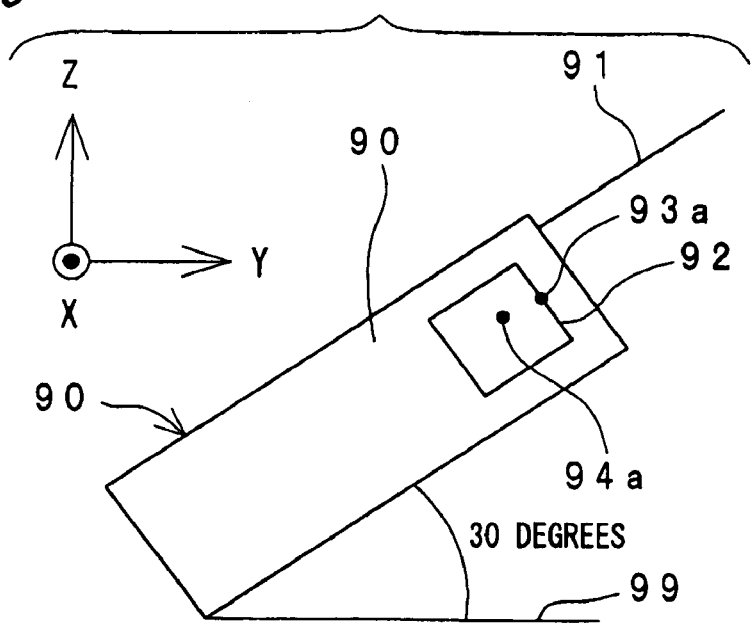
FIG. 19 is a front view showing the radio communication apparatus 90 shown in FIG. 18 when the radio communication apparatus 90 is inclined from a horizontal direction.
Figure 20:
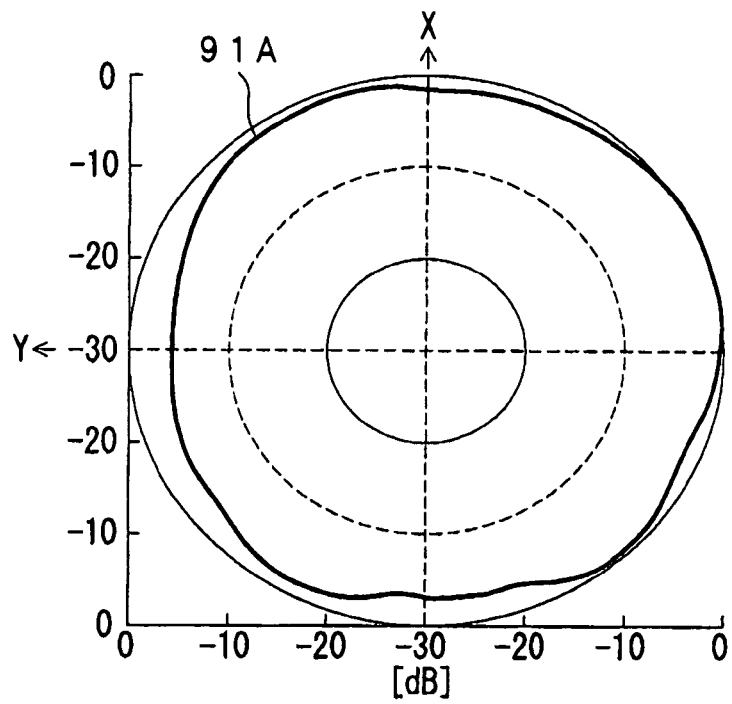
FIG. 20 is a diagram showing a directional pattern of a single antenna element 91 in case of FIG. 19.
Figure 21:
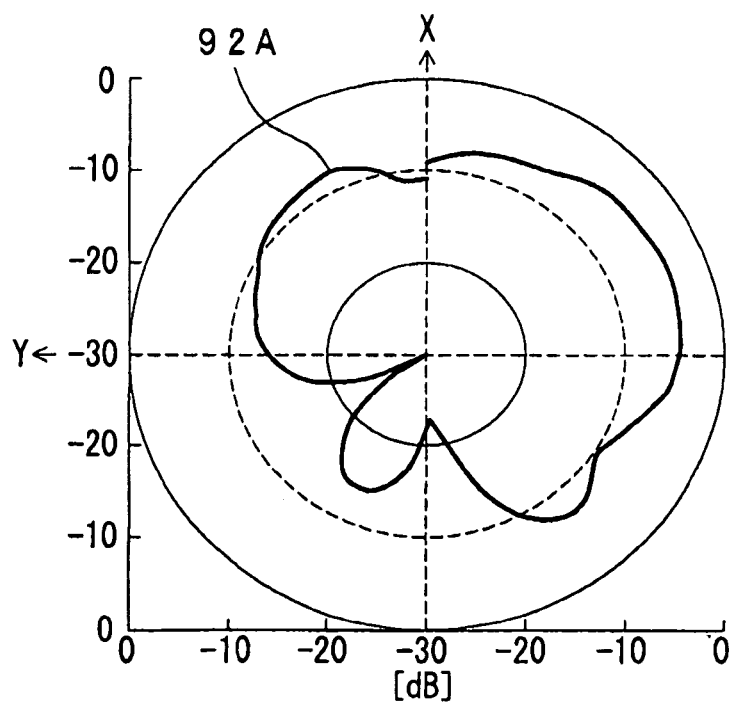
FIG. 21 is a diagram showing a directional pattern of a single antenna element 92 in case of FIG. 19.

FIG. 17 is a block diagram showing a configuration of a radio communication apparatus 110 according to an eleventh preferred embodiment of the present invention including an adaptive antenna apparatus 100. The radio communication apparatus 110 according to the eleventh preferred embodiment is characterized by being configured using the adaptive antenna apparatus 100 according to each of the preceding preferred embodiments.

Referring to FIG. 17, the radio communication apparatus 110 is configured by including the adaptive antenna apparatus 100, an input circuit 101 including a microphone 101A, an output circuit 102 including a loudspeaker 102A, a power source circuit 103 for supplying electric power to each circuit of the radio communication apparatus 110, and an apparatus controller 104 for controlling an overall operation of the radio communication apparatus 110. A voice inputted to the microphone 101A is converted into an electric signal. Then, an audio signal, which is the electric signal, is subjected to a processing such as an amplification by the input circuit 101, and is outputted to the modulator 9 of the adaptive antenna apparatus 100. The audio signal is then transmitted from the antenna elements 1a to 1d after being subjected to processings within the adaptive antenna apparatus 100. On the other hand, a radio signal received by the adaptive antenna apparatus 100 is demodulated into a baseband signal by the demodulator 6 of the adaptive antenna apparatus 100. Then, the baseband signal is inputted to the output circuit 102, and outputted from the loudspeaker 102A after being subjected to a processing such as an amplification.

The radio communication apparatus 110 configured as described above compares a received signal after the adaptive control with received signals received separately by the respective antenna elements. Accordingly, it is always possible to keep the highest signal quality for the received signals. Further, the radio communication apparatus 110 adaptively controls the transmitted signal. Accordingly, it is possible to realize a radio communication apparatus such as a portable radio apparatus that can ensure high signal quality as a system.

In the present preferred embodiment, the radio communication apparatus 110 includes a radio receiver circuit and a radio transmitter circuit. However, the present invention is not limited to this. The radio communication apparatus 110 may be configured only by the radio transmitter circuit.

As described so far in detail, each of the adaptive antenna apparatus and the radio communication terminal apparatus using the same according to the present invention compares the signal quality of the demodulated signal of the combined received signal with those of demodulated signals of the respective received signals separately received by the respective antenna elements, selects a demodulated signal having the highest signal quality, and controls to receive a received signal including the selected demodulated signal. Accordingly, even when only one antenna element among a plurality of antenna elements receives the interference wave, it is possible to suppress the interference wave.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An adaptive antenna apparatus comprising:
    a plurality of antenna elements;
    an adaptive controller for adaptively controlling respective received signals received by said plurality of antenna elements, and for outputting adaptively-controlled respective received signals as a combined received signal;
    a demodulator for demodulating the combined received signal into a demodulated signal, and for demodulating the respective received signals received separately by respective antenna elements into demodulated signals; and
    an apparatus controller for comparing signal quality of the demodulated signal of the combined received signal with signal qualities of the demodulated signals of the respective received signals received separately by the respective antenna elements, respectively, selecting a demodulated signal having the highest signal quality, and controlling to receive a received signal including a selected demodulated signal,
    wherein said plurality of antenna elements comprises three or more antenna elements,
    wherein said adaptive controller adaptively controls respective received signals received by all of said three or more antenna elements and outputs respective adaptively-controlled received signals as a first combined received signal, and said adaptive controller adaptively controls respective received signals received by antenna elements of a part of said three or more antenna elements and outputs respective adaptively-controlled received signals as a second combined received signal, and
    wherein said apparatus controller compares signal quality of a demodulated signal of the first combined received signal, signal quality of a demodulated signal of the second combined received signal, and the signal qualities of the demodulated signals of the respective received signals received separately by the respective antenna elements, selects a demodulated signal having the highest signal quality, and controls to receive a received signal including a selected demodulated signal.

2. The adaptive antenna apparatus as claimed in claim 1, wherein said apparatus controller executes a first reception adaptive control processing including the steps of:
    when the signal quality of the demodulated signal of the combined received signal is equal to or higher than a predetermined threshold value, controlling to receive the adaptively-controlled combined received signal; and
    when the signal quality of the demodulated signal of the combined received signal is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal.

3. The adaptive antenna apparatus as claimed in claim 1, wherein said apparatus controller executes a second reception adaptive control processing including the steps of:
    when the highest signal quality among the signal qualities of the demodulated signals of the respective received signals received separately by the respective antenna elements is equal to or higher than a predetermined threshold value, controlling to receive a received signal, which is one of the received signals received separately by the respective antenna elements, and which includes a demodulated signal having the highest signal quality among the signal qualities of the demodulated signals of the respective received signals separately received by the respective antenna elements, and
    when the highest signal quality among the signal qualities of the demodulated signals of the respective received signals received separately by the respective antenna elements is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal.

4. The adaptive antenna apparatus as claimed in claim 1, wherein said apparatus controller executes a third reception adaptive control processing including the steps of:
    after acquiring all of the signal quality of the demodulated signal of the combined received signal and the signal qualities of the demodulated signals of the respective received signals received separately by the respective antenna elements, comparing acquired signal qualities, selecting a demodulated signal having the highest signal quality, and controlling to receive a demodulated signal including a selected demodulated signal.

5. An adaptive antenna apparatus comprising:
    a plurality of antenna elements;
    an adaptive controller for adaptively controlling respective received signals received by said plurality of antenna elements, and for outputting adaptively-controlled respective received signals as a combined received signal;
    a demodulator for demodulating the combined received signal into a demodulated signal, and for demodulating the respective received signals received separately by respective antenna elements into demodulated signals; and an apparatus controller for comparing signal quality of the demodulated signal of the combined received signal with signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a first reception adaptive control processing including the steps of:

when the signal quality of the demodulated signal of the combined received signal is equal to or higher than a predetermined threshold value, controlling to receive the adaptively-controlled combined received signal; and when the signal quality of the demodulated signal of the combined received signal is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal.

6. An adaptive antenna apparatus comprising:

a plurality of antenna elements;

an adaptive controller for adaptively controlling respective received signals received by said plurality of antenna elements, and for outputting adaptively-controlled respective received signals as a combined received signal;

a demodulator for demodulating the combined received signal into a demodulated signal, and for demodulating the respective received signals received separately by respective antenna elements into demodulated signals; and an apparatus controller for comparing signal quality of the demodulated signal of the combined received signal with signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a second reception adaptive control processing including the steps of:

when the highest signal quality among the signal qualities of the demodulated signals of the respective received signals received separately by the respective antenna elements is equal to or higher than a predetermined threshold value, controlling to receive a received signal, which is one of the received signals received separately by the respective antenna elements, and which includes a demodulated signal having the highest signal quality among the signal qualities of the demodulated signals of the respective received signals separately received by the respective antenna elements, and when the highest signal quality among the signal qualities of the demodulated signals of the respective received signals received separately by the respective antenna elements is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal.

7. An adaptive antenna apparatus comprising:

a plurality of antenna elements;

an adaptive controller for adaptively controlling respective received signals received by said plurality of antenna elements, and for outputting adaptively-controlled respective received signals as a combined received signal;

a demodulator for demodulating the combined received signal into a demodulated signal, and for demodulating the respective received signals received separately by respective antenna elements into demodulated signals; and an apparatus controller for comparing signal quality of the demodulated signal of the combined received signal with signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a third reception adaptive control processing including the steps of:

after acquiring all of the signal quality of the demodulated signal of the combined received signal and the signal qualities of the demodulated signals of the respective received signals received separately by the respective antenna elements, comparing acquired signal qualities, selecting a demodulated signal having the highest signal quality, and controlling to receive a demodulated signal including a selected demodulated signal.

8. An adaptive antenna apparatus comprising:

a plurality of antenna elements;

an adaptive controller for adaptively controlling respective received signals received by said plurality of antenna elements, and for outputting adaptively-controlled respective received signals as a combined received signal;

a demodulator for demodulating the combined received signal into a demodulated signal, and for demodulating the respective received signals received separately by respective antenna elements into demodulated signals; and an apparatus controller for comparing signal quality of the demodulated signal of the combined received signal with signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a first reception adaptive control processing including the steps of:

when the signal quality of the demodulated signal of the combined received signal is equal to or higher than a predetermined threshold value, controlling to receive the adaptively-controlled combined received signal; and when the signal quality of the demodulated signal of the combined received signal is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a second reception adaptive control processing including the steps of:

when the highest signal quality among the signal qualities of the demodulated signals of the respective received signals received separately by the respective antenna elements is equal to or higher than a predetermined threshold value, controlling to receive a received signal, which is one of the received signals received separately by the respective antenna elements, and which includes a demodulated signal having the highest signal quality among the signal qualities of the demodulated signals of the respective received signals separately received by the respective antenna elements, and when the highest signal quality among the signal qualities of the demodulated signals of the respective received signals received separately by the respective antenna elements is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a third reception adaptive control processing including the steps of:

after acquiring all of the signal quality of the demodulated signal of the combined received signal and the signal qualities of the demodulated signals of the respective received signals received separately by the respective antenna elements, comparing acquired signal qualities, selecting a demodulated signal having the highest signal quality, and controlling to receive a demodulated signal including a selected demodulated signal, and wherein said apparatus controller executes one of the first, second, and third reception adaptive control processings by selectively switching over among the first, second, and third reception adaptive control processings, according to a predetermined selection criterion.

9. The adaptive antenna apparatus as claimed in claim 8, wherein said plurality of antenna elements comprises three or more antenna elements, wherein said adaptive controller adaptively controls respective received signals received by all of said three or more antenna elements and outputs respective adaptively-controlled received signals as a first combined received signal, and said adaptive controller adaptively controls respective received signals received by antenna elements of a part of said three or more antenna elements and outputs respective adaptively-controlled received signals as a second combined received signal, and wherein said apparatus controller compares signal quality of a demodulated signal of the first combined received signal, signal quality of a demodulated signal of the second combined received signal, and the signal qualities of the demodulated signals of the respective received signals received separately by the respective antenna elements, selects a demodulated signal having the highest signal quality, and controls to receive a received signal including a selected demodulated signal.

10. The adaptive antenna apparatus as claimed in claim 9, wherein the selection criterion is a criterion based on a transmission rate Vth of the demodulated signal.

11. The adaptive antenna apparatus as claimed in claim 9, wherein said apparatus controller executes one of the first, second, and third reception adaptive control processings by selectively switching over among the first, second, and third reception adaptive control processings using two predetermined threshold rates Vth1 and Vth2 in the following manners:

(A) when the communication rate Vth has a relationship of Vth<Vth1, said apparatus controller executes the second reception adaptive control processing;

(B) when the transmission rate Vth has a relationship of Vth1≦Vth≦Vth2, said apparatus controller executes the first reception adaptive control processing; and (C) when the transmission rate Vth has a relationship of Vth≧Vth2 said apparatus controller executes said third reception adaptive control processing.

12. The adaptive antenna apparatus as claimed in claim 8, wherein the selection criterion is a criterion based on a transmission rate Vth of the demodulated signal.

13. The adaptive antenna apparatus as claimed in claim 8, wherein said apparatus controller executes one of the first, second, and third reception adaptive control processings by selectively switching over among the first, second, and third reception adaptive control processings using two predetermined threshold rates Vth1 and Vth2 in the following manners:

(A) when the communication rate Vth has a relationship of Vth<Vth1, said apparatus controller executes the second reception adaptive control processing;

(B) when the transmission rate Vth has a relationship of Vth1≦Vth<Vth2, said apparatus controller executes the first reception adaptive control processing; and (C) when the transmission rate Vth has a relationship of Vth≧Vth2, said apparatus controller executes said third reception adaptive control processing.

14. A radio communication apparatus comprising:

an adaptive antenna apparatus; and a radio receiver circuit for receiving a radio signal using said adaptive antenna apparatus, wherein said adaptive antenna apparatus comprises:

a plurality of antenna elements;

an adaptive controller for adaptively controlling respective received signals received by said plurality of antenna elements, and for outputting adaptively-controlled respective received signals as a combined received signal;

a demodulator for demodulating the combined received signal into a demodulated signal, and for demodulating the respective received signals received separately by respective antenna elements into demodulated signals; and an apparatus controller for comparing signal quality of the demodulated signal of the combined received signal with signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a first reception adaptive control processing including the steps of:

when the signal quality of the demodulated signal of the combined received signal is equal to or higher than a predetermined threshold value, controlling to receive the adaptively-controlled combined received signal; and when the signal quality of the demodulated signal of the combined received signal is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a second reception adaptive control processing including the steps of:

when the highest signal quality among the signal qualities of the demodulated signals of the respective received signals received separately by the respective antenna elements is equal to or higher than a predetermined threshold value, controlling to receive a received signal, which is one of the received signals received separately by the respective antenna elements, and which includes a demodulated signal having the highest signal quality among the signal qualities of the demodulated signals of the respective received signals separately received by the respective antenna elements, and when the highest signal quality among the signal qualities of the demodulated signals of the respective received signals received separately by the respective antenna elements is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a third reception adaptive control processing including the steps of:

after acquiring all of the signal quality of the demodulated signal of the combined received signal and the signal qualities of the demodulated signals of the respective received signals received separately by the respective antenna elements, comparing acquired signal qualities, selecting a demodulated signal having the highest signal quality, and controlling to receive a demodulated signal including a selected demodulated signal, and wherein said apparatus controller executes one of the first, second, and third reception adaptive control processings by selectively switching over among the first, second, and third reception adaptive control processings, according to a predetermined selection criterion.

15. The radio communication apparatus as claimed in claim 14, wherein said plurality of antenna elements comprises three or more antenna elements, wherein said adaptive controller adaptively controls respective received signals received by all of said three or more antenna elements and outputs respective adaptively-controlled received signals as a first combined received signal, and said adaptive controller adaptively controls respective received signals received by antenna elements of a part of said three or more antenna elements and outputs respective adaptively-controlled received signals as a second combined received signal, and wherein said apparatus controller compares signal quality of a demodulated signal of the first combined received signal, signal quality of a demodulated signal of the second combined received signal, and the signal qualities of the demodulated signals of the respective received signals received separately by the respective antenna elements, selects a demodulated signal having the highest signal quality, and controls to receive a received signal including a selected demodulated signal.

16. A radio communication apparatus comprising:

an adaptive antenna apparatus; and a radio transceiver circuit that transmits and receives a radio signal using said adaptive antenna apparatus, wherein said adaptive antenna apparatus comprises:

a plurality of antenna elements;

an adaptive controller for adaptively controlling respective received signals received by said plurality of antenna elements, and for outputting adaptively-controlled respective received signals as a combined received signal;

a demodulator for demodulating the combined received signal into a demodulated signal, and for demodulating the respective received signals received separately by respective antenna elements into demodulated signals; and an apparatus controller for comparing signal quality of the demodulated signal of the combined received signal with signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a first reception adaptive control processing including the steps of:

when the signal quality of the demodulated signal of the combined received signal is equal to or higher than a predetermined threshold value, controlling to receive the adaptively-controlled combined received signal; and when the signal quality of the demodulated signal of the combined received signal is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a second reception adaptive control processing including the steps of:

when the highest signal quality among the signal qualities of the demodulated signals of the respective received signals received separately by the respective antenna elements is equal to or higher than a predetermined threshold value, controlling to receive a received signal, which is one of the received signals received separately by the respective antenna elements, and which includes a demodulated signal having the highest signal quality among the signal qualities of the demodulated signals of the respective received signals separately received by the respective antenna elements, and when the highest signal quality among the signal qualities of the demodulated signals of the respective received signals received separately by the respective antenna elements is lower than the predetermined threshold value, comparing the signal quality of the demodulated signal of the combined received signal with the signal qualities of the demodulated signals of the respective received signals received separately by the respective antenna elements, respectively, selecting a demodulated signal having the highest signal quality, and controlling to receive a received signal including a selected demodulated signal, wherein said apparatus controller executes a third reception adaptive control processing including the steps of:

after acquiring all of the signal quality of the demodulated signal of the combined received signal and the signal qualities of the demodulated signals of the respective received signals received separately by the respective antenna elements, comparing acquired signal qualities, selecting a demodulated signal having the highest signal quality, and controlling to receive a demodulated signal including a selected demodulated signal; and wherein said apparatus controller executes one of the first, second, and third reception adaptive control processings by selectively switching over among the first, second, and third reception adaptive control processings, according to a predetermined selection criterion.

17. The radio communication apparatus as claimed in claim 16, wherein said plurality of antenna elements comprises three or more antenna elements, wherein said adaptive controller adaptively controls respective received signals received by all of said three or more antenna elements and outputs respective adaptively-controlled received signals as a first combined received signal, and said adaptive controller adaptively controls respective received signals received by antenna elements of a part of said three or more antenna elements and outputs respective adaptively-controlled received signals as a second combined received signal, and wherein said apparatus controller compares signal quality of a demodulated signal of the first combined received signal, signal quality of a demodulated signal of the second combined received signal, and the signal qualities of the demodulated signals of the respective received signals received separately by the respective antenna elements, selects a demodulated signal having the highest signal quality, and controls to receive a received signal including a selected demodulated signal.

* * * * *